US008233745B2

(12) United States Patent
Matsumoto et al.

(10) Patent No.: US 8,233,745 B2
(45) Date of Patent: Jul. 31, 2012

(54) IMAGE PROCESSING APPARATUS AND IMAGE PROCESSING METHOD

(75) Inventors: Nobuyuki Matsumoto, Tokyo (JP); Takashi Ida, Kanagawa (JP); Toshimitsu Kaneko, Kanagawa (JP); Hidenori Takeshima, Tokyo (JP); Yasunori Taguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1019 days.

(21) Appl. No.: 12/048,925

(22) Filed: Mar. 14, 2008

(65) Prior Publication Data

US 2009/0074328 A1  Mar. 19, 2009

(30) Foreign Application Priority Data

Sep. 13, 2007  (JP) ................. 2007-237645

(51) Int. Cl.
*G06K 9/00* (2006.01)
*G06K 9/40* (2006.01)
*G06K 9/32* (2006.01)
*H04N 7/01* (2006.01)
*H04N 1/46* (2006.01)

(52) U.S. Cl. ........ 382/299; 382/164; 382/266; 382/298; 382/300; 348/441; 358/525

(58) Field of Classification Search .................. 382/299, 382/300, 298; 348/441; 358/525
See application file for complete search history.

(56) References Cited

U.S. PATENT DOCUMENTS

| 6,285,804 | B1 | 9/2001 | Crinon et al. | |
| 6,714,693 | B1 * | 3/2004 | Miyake | 382/300 |
| 7,545,391 | B2 * | 6/2009 | Le Dinh et al. | 345/660 |
| 7,657,122 | B2 * | 2/2010 | Tanida et al. | 382/299 |
| 7,817,872 | B2 * | 10/2010 | Michel et al. | 382/266 |
| 7,840,095 | B2 * | 11/2010 | Yamada | 382/299 |

(Continued)

FOREIGN PATENT DOCUMENTS

JP  2000-188680  7/2000

(Continued)

OTHER PUBLICATIONS

Shen et al., "Motion Adaptive Deinterlacing of Video Data with Texture Detection", IEEE Transactions on Consumer Electronics, vol. 52 Issue 4, Jan. 8, 2007, pp. 1403-1408.*

(Continued)

*Primary Examiner* — Brian Q Le
*Assistant Examiner* — Jose M Torres
(74) *Attorney, Agent, or Firm* — Oblon, Spivak, McClelland, Maier & Neustadt, L.L.P.

(57) ABSTRACT

An image processing apparatus calculates estimated pixel values of respective pixels of a provisional high-resolution image by interpolation on basis of pixel values in a reference frame. Interior of the reference frame is segmentalized into an edge region, a texture region or a flat region and others on a basis of pixel values of respective pixels. The respective pixels in the reference frame are set as target pixels one by one in sequence. Corresponding positions on the provisional high-resolution image are calculated, of the respective target pixels in decimal accuracy on a basis of information on the segmented regions including the target values. The estimated pixel values are modified so that differences from the pixel values of the target pixels to provisionally estimated pixel values obtained from the estimated pixel values of the provisional high-resolution image for pixels around the corresponding positions of the target pixels, becomes smaller. Modified pixel values and then obtained.

8 Claims, 33 Drawing Sheets

U.S. PATENT DOCUMENTS

| | | | |
|---|---|---|---|
| 7,889,207 B2 * | 2/2011 | Hong et al. | 345/582 |
| 2007/0046785 A1 | 3/2007 | Matsumoto et al. | |
| 2007/0269137 A1 | 11/2007 | Ida et al. | |
| 2007/0291170 A1 * | 12/2007 | Han et al. | 348/458 |
| 2008/0092078 A1 | 4/2008 | Takeshima et al. | |

FOREIGN PATENT DOCUMENTS

JP  2001-34737  2/2001

OTHER PUBLICATIONS

U.S. Appl. No. 11/828,397, filed Jul. 26, 2007, Matsumoto, et al.
U.S. Appl. No. 11/953,370, filed Dec. 10, 2007, Unknown.
U.S. Appl. No. 12/026,674, filed Feb. 6, 2008, Unknown.
U.S. Appl. No. 12/398,742, filed Mar. 5, 2009, Ida, et al.
U.S. Appl. No. 12/397,747, filed Mar. 4, 2009, Matsumoto, et al.
U.S. Appl. No. 12/408,918, filed Mar. 23, 2009, Takeshima, et al.
U.S. Appl. No. 12/233,155, filed Sep. 18, 2008, Taguchi, et al.
U.S. Appl. No. 12/233,030, filed Sep. 18, 2008, Takeshima, et al.
Office Action issued Aug. 23, 2011, in Japanese Patent Application No. 2007-237645 with English translation.
Sung Cheol Park, et al., "Super-Resolution Image Reconstruction: A Technical Overview", IEEE Signal Processing Magazine, May 2003, pp. 21-36.

* cited by examiner

FIG.30

|     |          |          |          |   |   |
|-----|----------|----------|----------|---|---|
|     | $y_{11}$ | $y_{12}$ | $y_{13}$ |   |   |
|     | $y_{21}$ | $y_{22}$ | $y_{23}$ |   |   |
|     | $y_{31}$ | $y_{32}$ | $y_{33}$ |   |   |
|     |          |          |          |   |   |

A101, A102

| -1 | 0 | 1 |
|----|---|---|
| -2 | 0 | 2 |
| -1 | 0 | 1 |

A103

| 1  | 2  | 1  |
|----|----|----|
| 0  | 0  | 0  |
| -1 | -2 | -1 |

A104

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2007-237645, filed on Sep. 13, 2007; the entire contents of which are incorporated herein by reference.

BACKGROUND OF THE INVENTION

1. Field of the Invention

The present invention relates to an image processing apparatus which enhances the resolution of a low-resolution image and an image processing method.

2. Description of the Related Art

Recently, high-resolution televisions or displays having a large number of pixels are in widespread use. The televisions or displays convert the number of pixels of an image data into the number of pixels of a panel when displaying an image. Interpolation in which filtering is carried out with Sinc function based on the sampling theorem (cubic convolution, BiCubic method, etc.) when applying a resolution enhancement process, and a multi-frame deterioration inverse conversion method which provides images sharper than those obtained by the interpolation are known. Please see, for example, JP-A 2000-188680 (KOKAI), and "Super-Resolution Image Reconstruction: A Technical Overview" by S. Park, et al, IEEE Signal Processing Magazine, USA, IEEE, May 2003, pp. 21-36.

The multi-frame deterioration inverse conversion method is a method of resolution enhancement devised by giving an eye to the fact that a shooting object coming out in a reference frame (a frame intended to enhance the resolution) also comes out in other frames continuing therefrom and composed of the steps of detecting the movement of a shooting object in decimal accuracy, which is finer than the pixel intervals, obtaining a plurality of sample values shifted minutely in position for an identical local part of the shooting object, and modifying the pixel values successively for the plurality of sample values respectively through the interpolation in the related art.

In the multi-frame deterioration inverse conversion method, there is a problem that the quality of high-resolution image may be deteriorated because there are cases that the pixel values are modified by the sample values detected by wrong corresponding positions, and that noise component in a flat area is modified sharply.

BRIEF SUMMARY OF THE INVENTION

In view of such circumstances, it is an object of the invention to provide an image processing apparatus which achieves resolution enhancement to provide sharp and high-quality images and an image processing method.

According to embodiments of the present invention, the embodiments provide an image processing apparatus including a pixel value calculating unit configured to calculate estimated pixel values of respective pixels of a provisional high-resolution image composed of "m" pixels by interpolation on basis of pixel values of respective pixels in a reference frame having "n" pixels (m>n); a segmentation unit configured to segment interior of the reference frame into an edge region and other regions, into a texture region and other regions or into a flat region and other regions depending on information on the pixel values of the respective pixels in the reference frame; a position calculating unit configured to set the respective pixels in the reference frame as target pixels one by one in sequence and calculate corresponding positions on the provisional image, of the respective target pixels, in fractional pixel accuracy on basis of information on the segmented regions including the target pixels; a converting unit configured to modify the respective estimated pixel values so that finite difference between the provisionally estimated pixel values of the target pixels, which are obtained from the estimated pixel values of the provisional high-resolution image for pixels around the corresponding positions of the target pixels, and the pixel values of the target pixels becomes smaller and obtain modified pixel values; and an output unit configured to output image composed of "m" pixels having the modified pixel values.

According to the invention, the resolution enhancement process suitable for the respective regions is enabled, and a sharp and high-quality high-resolution image is obtained.

BRIEF DESCRIPTION OF THE DRAWINGS

FIG. 30 illustrates a state of detecting an edge region.

DETAILED DESCRIPTION OF THE INVENTION

Figure 1:
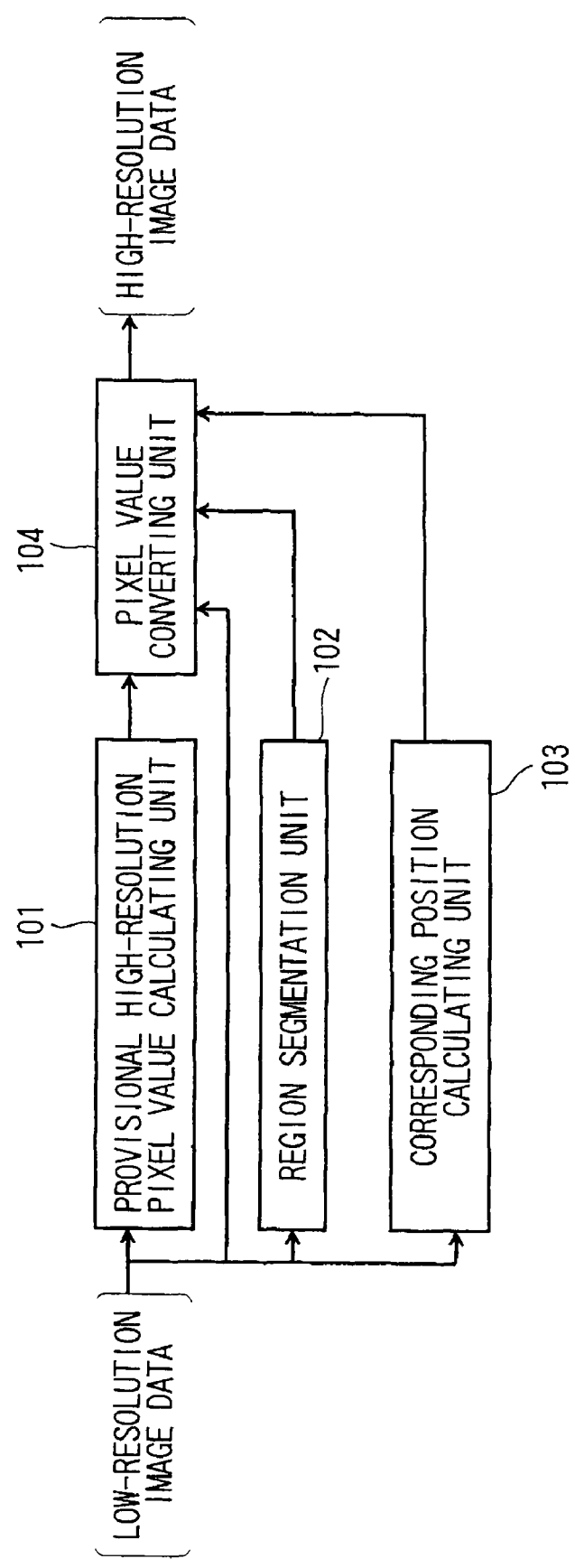
FIG. 1 is a block diagram of an image processing apparatus according to a first embodiment of the invention.

Referring now to the drawings, an image processing apparatus which enhance the resolution of low-resolution images according to embodiments of the invention will be described in detail. The image may be referred to as a frame in the description below.

First Embodiment

Referring to FIG. 1 to FIG. 15 and FIG. 30 to FIG. 32, an image processing apparatus according to a first embodiment of the invention will be described below.

(1) Configuration of Image Processing Apparatus

FIG. 1 is a block diagram of the image processing apparatus according to the first embodiment.

As shown in FIG. 1, the image processing apparatus includes a provisional high-resolution pixel value calculating unit (hereinafter, referred to as pixel value calculating unit) 101, a region segmentation unit 102, a corresponding position calculating unit 103 and a pixel value converting unit 104.

The functions of the respective units 101 to 104 can be implemented, for example, by a program embedded in LSI. In other words, they can be implemented by an apparatus which is capable of carrying out parallel processing.

(1-1) Pixel Value Calculating Unit 101

The pixel value calculating unit 101 receives a supply of low-resolution image data in which a plurality of pixels are arranged in a screen and the luminance of the pixels are represented as pixel values.

One frame in the low-resolution image data is set as a reference frame, and pixel values of provisional high-resolution image data having a larger number of pixels than the number of pixels included in the reference frame are calculated through interpolation on the basis of the pixel values in the reference frame.

The low-resolution image data is a moving image data. Here, the low-resolution image data will be described, for example, as moving image data shot by a camera or a mobile phone, image data that a television or a mobile AV player receives, or moving image data stored in a HDD.

(1-2) Region Segmentation Unit 102

The region segmentation unit 102 receives a supply of low-resolution image data and segmentalizes one or more frames included in the low-resolution image data into at least two regions on the basis of the change of the pixel value.

As a method of segmenting the low-resolution image data, for example, low-resolution image data is segmented into an edge region in which the change of the pixel values occurs linearly, a texture region including a large number of pixels whose pixel value is changed significantly in a local area and a flat area in which the change of the pixel values in the local area is little.

For example, the region segmentation unit 102 segmentalizes the frame into the flat region in which the change of the pixel values in the local area is little and a non-flat region other than the flat region.

(1-3) Corresponding Position Calculating Unit 103

The corresponding position calculating unit 103 receives a supply of low-resolution image data and sets a plurality of pixels in one or more frames included in the low-resolution image data in sequence one by one as a target pixel.

Then, the corresponding position calculating unit 103 calculates one of more positions (hereinafter, referred to as "corresponding positions") in the reference frame to which the target pixel corresponds is calculated in decimal accuracy.

An example of a method shown below is a method of calculating the corresponding positions in decimal accuracy.

A first method obtains the positions in a decimal accuracy having a minute matching error by obtaining a matching error on the basis of the pixel intervals in the low-resolution image data and applying continuous symmetry functions thereto. This is a matching error interpolation.

A second method enlarges low-resolution image data and obtains corresponding positions on the basis of the pixel intervals in the enlarged image. This is an oversampling method.

A third method physically detects the corresponding positions in decimal accuracy by providing a gyroscope in a camera and measuring shaking of the camera.

(1-4) Pixel Value Converting Unit 104

The pixel value converting unit 104 receives a supply of the pixel values of provisional high-resolution image data calculated by the pixel value calculating unit 101, the pixel values of the low-resolution image data, area information calculated by the region segmentation unit 102 and the corresponding positions calculated by the corresponding position calculating unit 103.

Then, the pixel value converting unit 104 selects the corresponding positions according to the area information. Operation of addition and subtraction with respect to the pixel value of the provisional high-resolution image data to make the error between the pixel value of the target pixel in the low-resolution image data and estimated pixel value generated using the pixel value of the provisional high-resolution image data and the selected corresponding position smaller is repeated for all the target pixels to be set in sequence, so that the pixel value conversion processing is achieved.

As a method of converting the pixel values of the provisional high-resolution image data, for example, POCS method, Iterative Back-Projection method (see p. 29, p. 31 in Non-Patent Document 1) are used.

As a method of selecting the corresponding positions, for example, the corresponding positions on the basis of the corresponding positions between frames in the edge region and the corresponding positions of the target pixels in the texture region in the reference frame are selected. In general, the detection accuracy of the corresponding positions in the edge region is high. Since the corresponding positions of only the target pixels in the reference frame have no movement, the corresponding positions are calculated always correctly. As regards the flat region, the pixel values of the provisional high-resolution image data may be used as is, so that the pixel value conversion on the basis of the corresponding positions is not necessary.

In another method of selecting the corresponding position, for example, only the corresponding positions of the target pixels in the non-flat region are selected.

In this manner, by segmenting the low-resolution image data into regions on the basis of the change of the pixel values and converting the pixel values for the corresponding positions selected on the basis of region segmentation information, the pixel value conversion on the basis of the sample values detected by the wrong corresponding positions is eliminated, so that noise component in the flat region is avoided from being emphasized.

In addition, the provisional high-resolution image data having the pixel values of the modified provisional high-resolution image data is outputted as sharp high-resolution image data.

(2) Operation of Image Processing Apparatus

Figure 2:
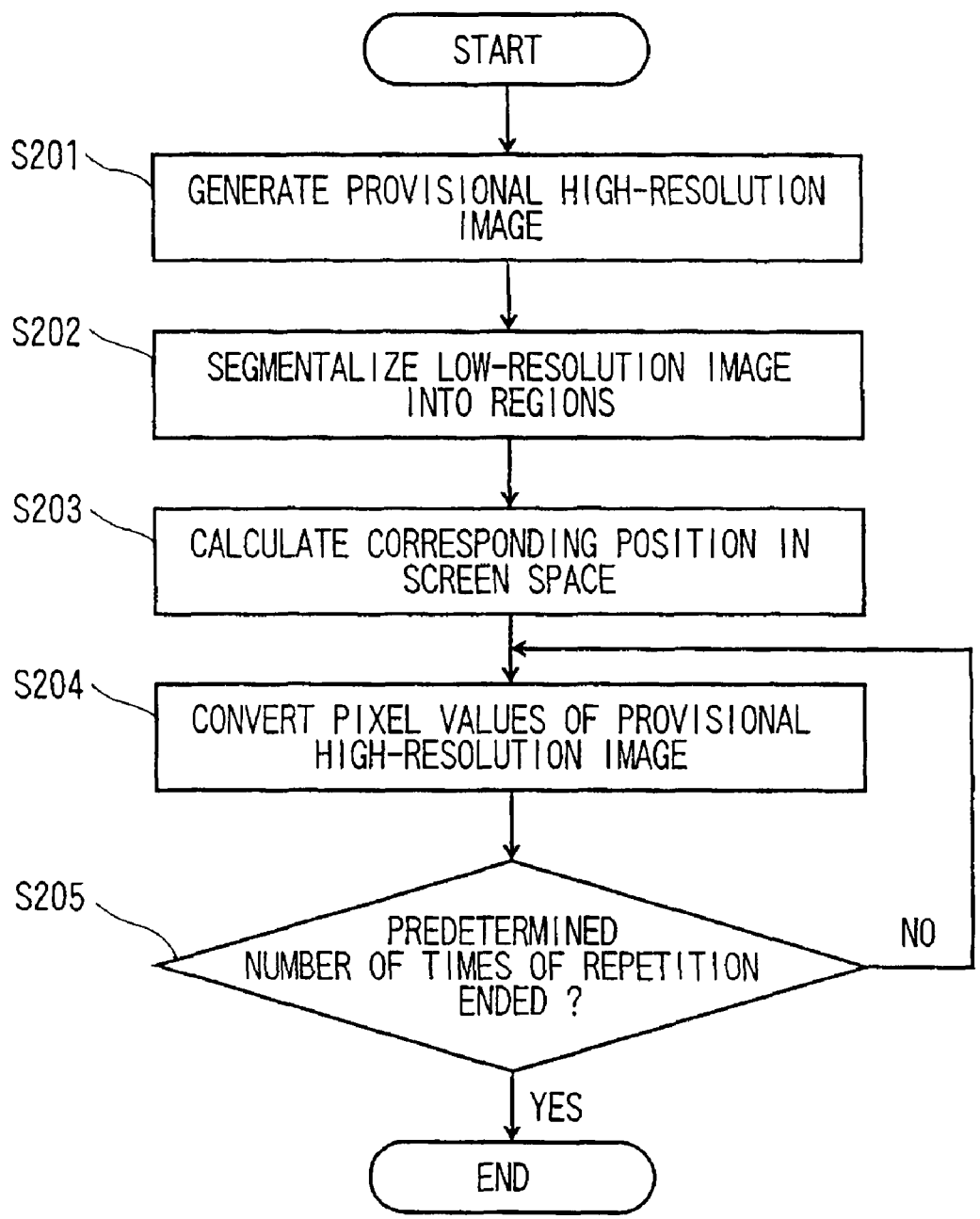
FIG. 2 is a flowchart showing an example of operation of the image processing apparatus according to the invention.

FIG. 2 is a flow chart for explaining operation for outputting high-resolution image data from low-resolution image data by the image processing apparatus described in conjunction with FIG. 1. Referring now to FIG. 1 and FIG. 2, a method of forming high-resolution image data will be described.

(2-1) Step S201

Firstly, provisional high-resolution image data is generated (Step S201).

More specifically, the pixel value calculating unit 101 sets one frame of low-resolution image data in which a plurality of pixels are arranged in a screen and luminance of these pixels are expressed as pixel values as a reference frame, and calculates pixel values of provisional high-resolution image data having a larger number of pixels than the number of pixels included in the reference frame by interpolation on the basis of the pixel values in the reference frames.

The interpolation includes interpolation using filtering with Sinc function on the basis of sampling theorem (cubic convolution, BiCubic method). In this manner, the reference frame set from the low-resolution image data is enlarged as a provisional high-resolution image data.

In this state, in the provisional high-resolution image data, a shooting object in the screen may be blurred, or a portion which is supposed to be a continuous straight line may be expressed in a stepped manner which is called jaggy.

(2-2) Step S202

Subsequently, the low-resolution image data is segmented into two or more regions on the basis of the change of the pixel values (Step S202).

More specifically, the region segmentation unit 102 segmentalizes at least one frame included in the low-resolution data into two or more regions on the basis of the change of the pixel values. As a method of segmenting the low-resolution image data, for example, the low-resolution image data is segmented into an edge region in which the change of the pixel values occurs linearly, a texture region including a large number of pixels whose pixel value is significantly changed in a local area and a flat area in which the change of the pixel values in the local area is little. Alternatively, for example, it is segmented into the flat region in which the change of the pixel values in the local area is little and a non-flat region other than the flat region.

(2-3) Step S203

Subsequently, the corresponding positions in the screen space are calculated (Step S203).

More specifically, the corresponding position calculating unit 103 sets a plurality of pixels in the one or more frames included in the low-resolution image data in sequence one by one as a target pixel, and calculates one or more corresponding positions of the target pixels in the reference frames in decimal accuracy.

The calculation of the corresponding positions in decimal accuracy is achieved by calculating by a matching error interpolation or an over sampling method on the basis of the low-resolution image data or by detecting by a gyroscope mounted in the camera.

(2-4) Step S204

Subsequently, the pixel values of the provisional high-resolution image are converted (Step S204).

More specifically, the pixel value converting unit 104 receives a supply of the pixel values of the provisional high-resolution image data calculated by the pixel value calculating unit 101, the pixel values of the low-resolution image data, the area information calculated by the region segmentation unit 102 and the corresponding positions calculated by the corresponding position calculating unit 103, and the corresponding positions are selected according to the area information. The pixel values of the provisional high-resolution image data are added or subtracted to make the error between the pixel value of the target pixel in the low-resolution image data and estimated pixel value generated using the pixel values of the provisional high-resolution image data and the selected corresponding positions become smaller.

The conversion of the pixel values of the provisional high-resolution image is achieved, for example, by POCS method or Iterative Back-Projection method (see p. 29, p. 31 in Non-Patent Document 1).

The selection of the corresponding positions is achieved, for example, by selecting the corresponding positions on the basis of the corresponding positions between the frames in the edge region and the corresponding positions of the target pixels in the texture region in the reference frame. In general, detection accuracy of the corresponding positions in the edge region is high. Since the corresponding positions of only the target pixels in the reference frame have no movement, the corresponding positions are calculated always correctly. As regards the flat region, the pixel values of the provisional high-resolution image data may be used satisfactorily as is, so that the pixel value conversion on the basis of the corresponding positions is not necessary.

In another method of selecting the corresponding position, for example, only the corresponding positions of the target pixels in the non-flat region are selected.

(2-5) Step S205

Subsequently, whether or not the predetermined number of times of repetition is finished is determined (Step S205).

More specifically, whether or not repetition of the conversion using all the selected corresponding positions by the pixel value converting unit 104 is finished by the predetermined number of times is determined. If No, the procedure goes back to Step S204, and the conversion of the provisional high-resolution image for the initially selected corresponding positions is carried out and, if "Yes", the provisional high-resolution image data is outputted as the high-resolution image and the procedure is ended.

(3) Relation Among Low-Resolution Image Data, Reference Frame and High-Resolution Image Data Referring now to FIG. 3 to FIG. 8, the relation among the low-resolution image data, the reference frame and the high-resolution image data will be described in order to explain the operation of the corresponding position calculating unit 103 and the pixel value converting unit 104 in detail.

Figure 3:
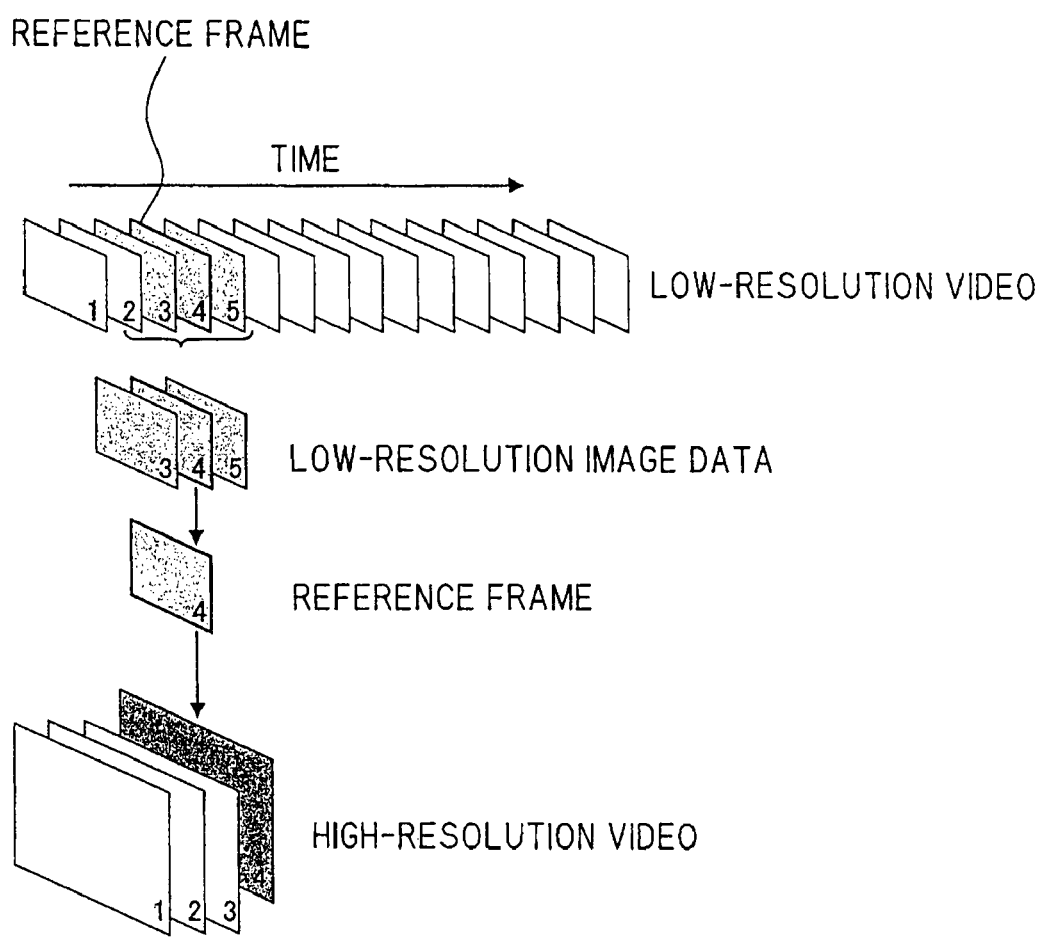
FIG. 3 illustrates a state in which a high-resolution frame is generated from three low-resolution frames.

(3-1) Description of FIG. 3

FIG. 3 illustrates a state in which the high-resolution video is generated in time sequence using a continuous low-resolution image (video data).

As shown in FIG. 3, a fourth high-resolution image frame is being generated here. A low-resolution image frame (in this example, a fourth frame of the low-resolution image) being enlarged at this moment is defined as the reference frame. The reference frame and a third low-resolution image frame and a fifth low-resolution image frame before and after in time sequence (third to fifth frames in this case) are referred to as the low-resolution image data.

Figure 4:
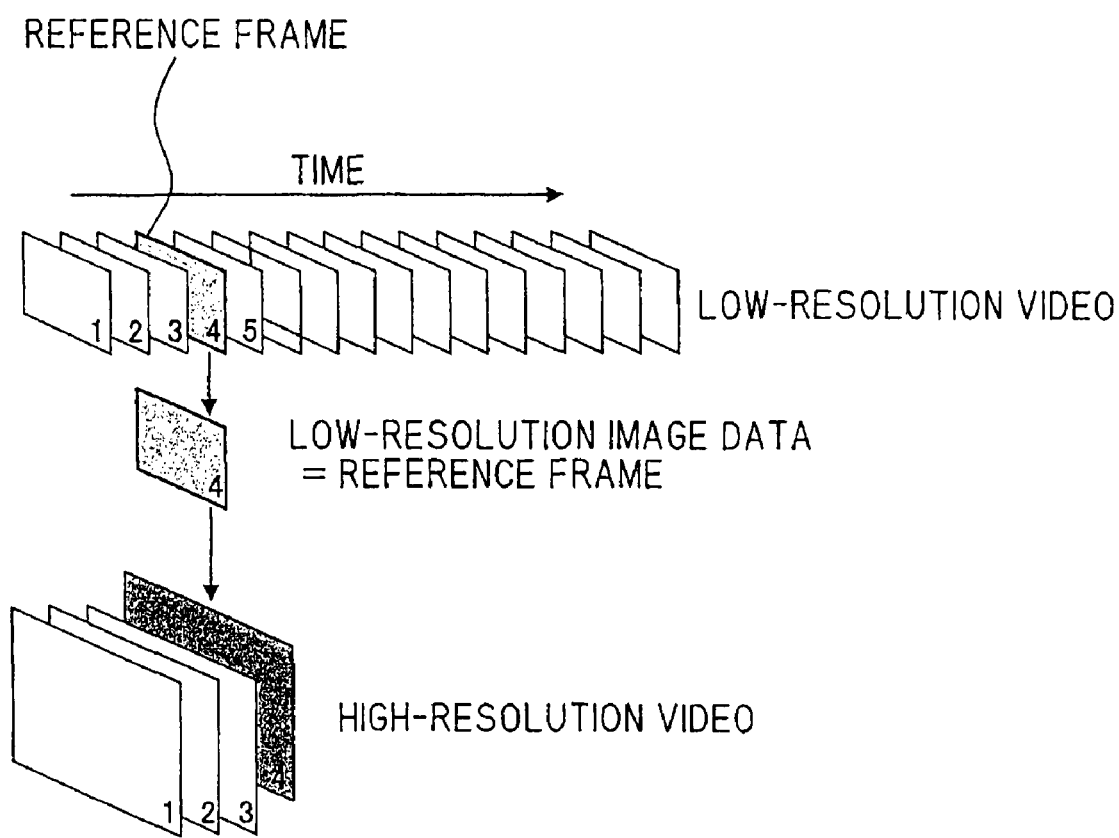
FIG. 4 illustrates a state in which the high-resolution frame is generated from one low-resolution frame.

(3-2) Description of FIG. 4

In FIG. 4, the enlargement is carried out only with in-frame processing using only a low-resolution image frame as the reference frame. Since only one low-resolution image is supplied in the case of a still image, this frame is set as the reference frame, and only this single reference frame is used for enlargement. It is expressed for convenience that the still image has one frame.

Figure 5:
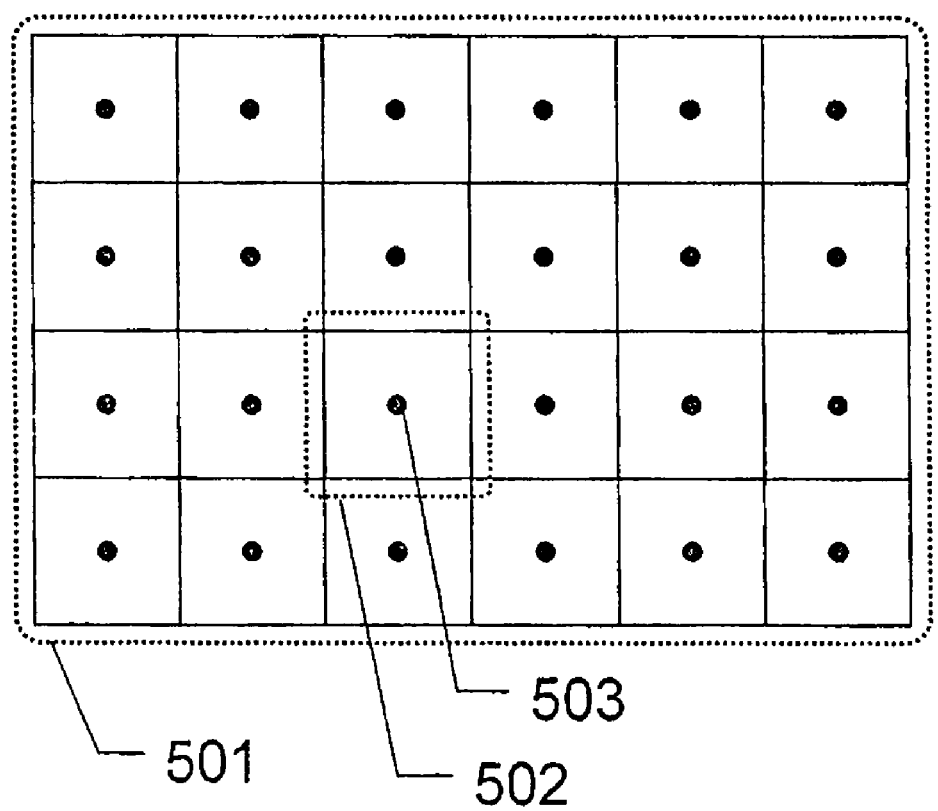
FIG. 5 illustrates a positional relationship between a screen and pixels of the low-resolution frame.

(3-3) Description of FIG. 5

FIG. 5 is a drawing showing the positional relationship among a low-resolution frame screen 501, pixels 502 and sample points 503.

Basically, in the image, luminance is continuously distributed in a screen space. However, in the case of the digital image data handled here, pixels are arranged as discrete sample points in the screen space, and peripheral luminance is represented only by the luminance of these pixels as shown in FIG. 5.

In FIG. 5, the screen 501 is segmented into twenty-four squares in 6 columns in the transverse direction and four rows in the vertical direction, and twenty-four pixels 502 are arranged with center points thereof are defined as the sample points 503. The representative value of luminance at each sample point 503 is referred to as the pixel value.

Figure 6:
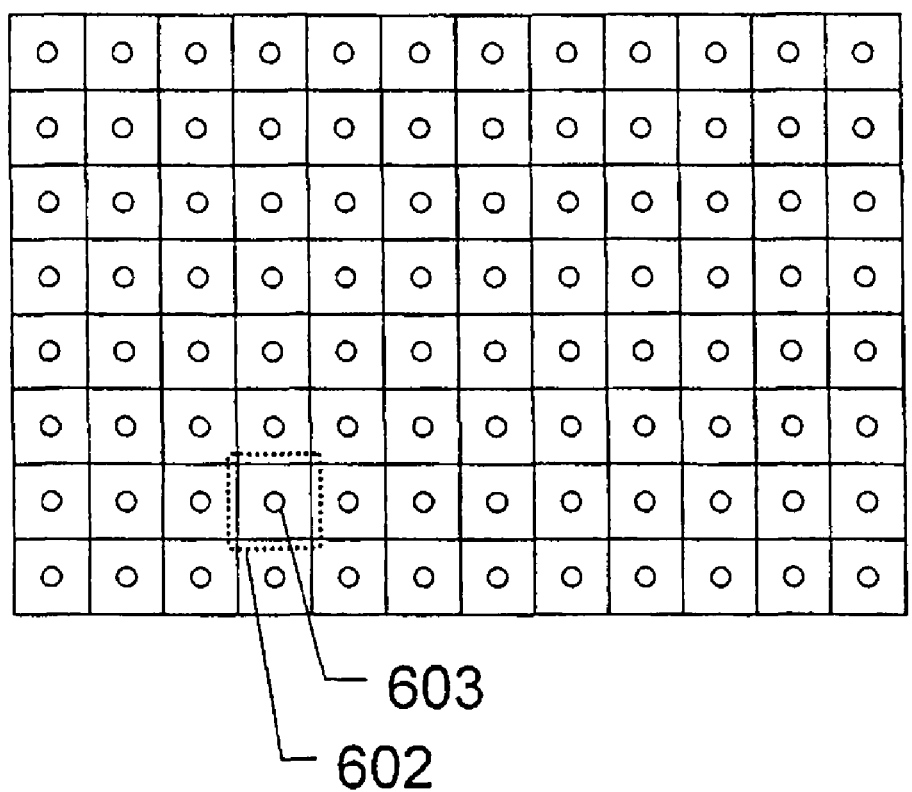
FIG. 6 illustrates the high-resolution frame obtained by enhancing the resolution of the low-resolution frame.

(3-4) Description of FIG. 6

FIG. 6 illustrates the screen shown in FIG. 5 which is enhanced in resolution by doubling in the transverse direction and doubling in the vertical direction.

Sample points 603 of pixels 602 of the high-resolution image frame are represented by hollow circles. In this manner, the intervals of the sample point 603 of the pixels 602 are half that of the low-resolution image frame.

Figure 7:
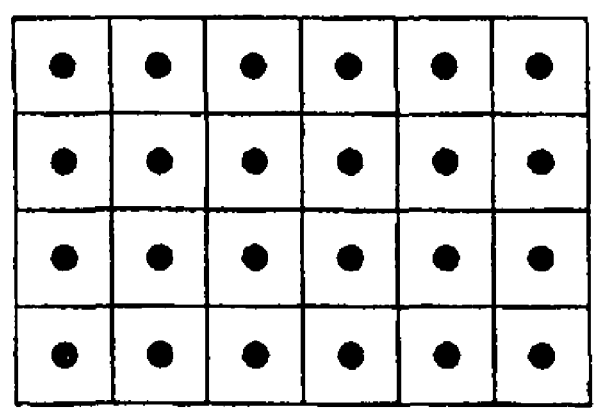
FIG. 7 illustrates the low-resolution frame whose pixel intervals are aligned with the pixel intervals of the high-resolution frame.

(3-5) Description of FIG. 7

In FIG. 7, the pixels in the original low-resolution image frame are arranged at the same intervals as the high-resolution image frame.

In this case, the size of the low-resolution image frame is smaller than the size of the high-resolution image frame. In this manner, when the screen size of the low-resolution image frame is equalized with the size of the high-resolution image frame, the intervals of the sample points of the pixels are widened, and when the intervals of the sample points of the pixels in the low-resolution image frame are aligned with the high-resolution image frame, the screen size is reduced. However, these are equivalent, and hence the low-resolution image frame may be expressed as in FIG. 5 and in FIG. 7 as needed.

Figure 8:
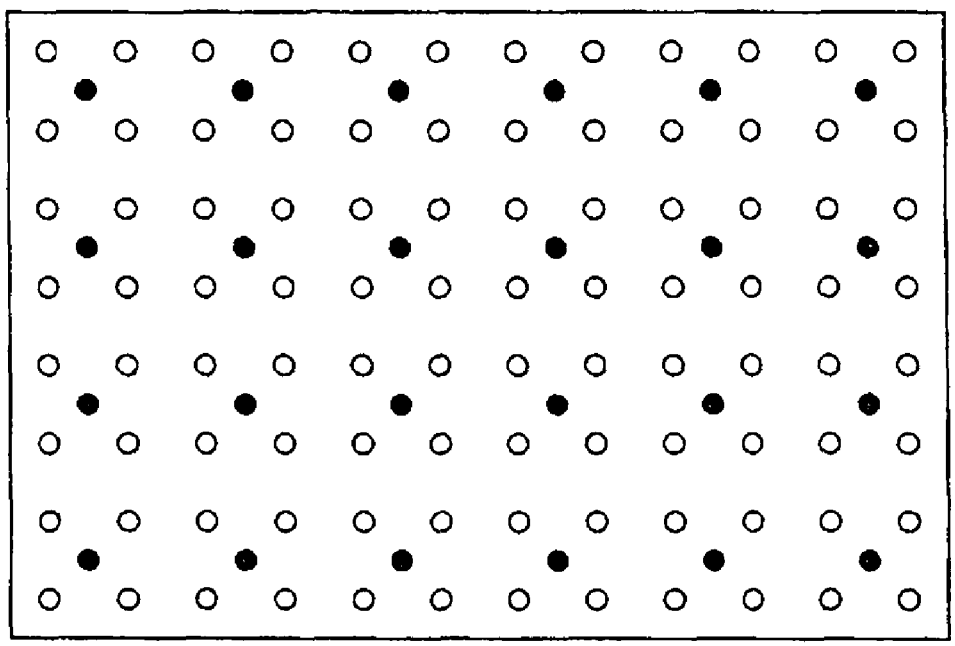
FIG. 8 illustrates a positional relationship between the sample points of the low-resolution frame and the sample points of the high-resolution frame.

(3-6) Description of FIG. 8

FIG. 8 illustrates sample points of the pixels in the low-resolution image frame in solid circles, and the sample points of the pixels in the high-resolution image frame in hollow circles.

As shown in FIG. 8, enlargement, that is, enhancement of resolution is achieved by obtaining the pixel values of the sample points shown in hollow circles on the basis of the pixel values provided to the sample points in solid circles. In this case, sharp enhancement of the resolution is achieved by using not only the selected reference frame in the low resolution image, but also, for example, the low-resolution image data such as the frame before and after the reference frame in time sequence.

(4) Description of Region Segmentation Unit 102

Figure 31:
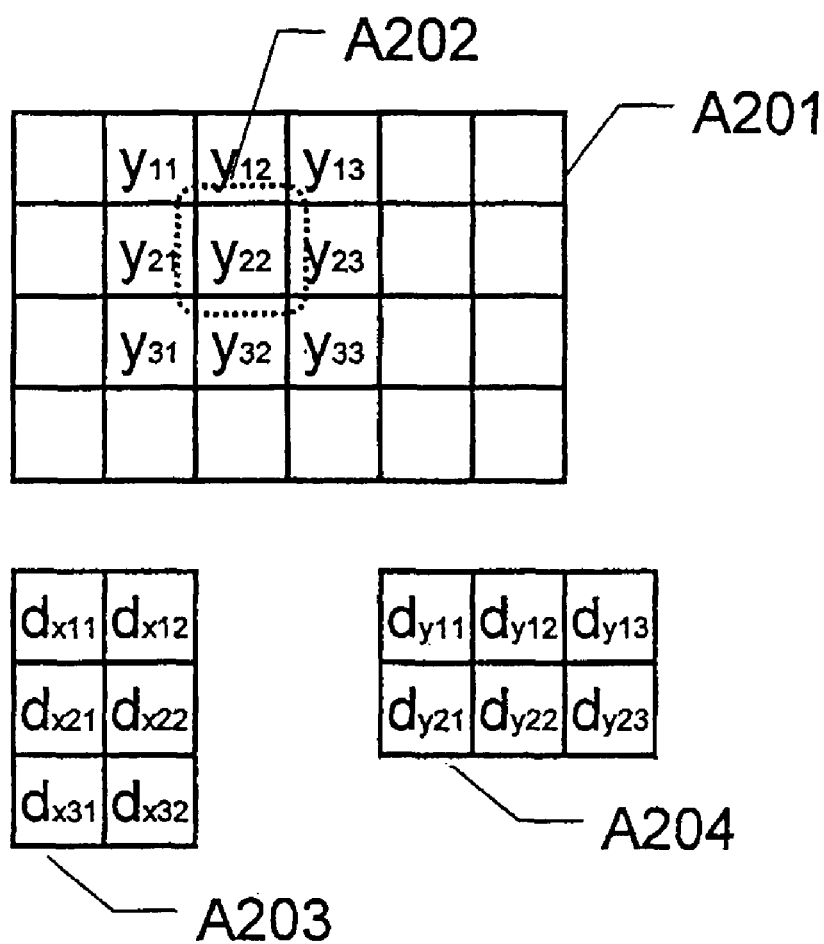
FIG. 31 illustrates a state of detecting a texture region and a flat region.
Figure 33:
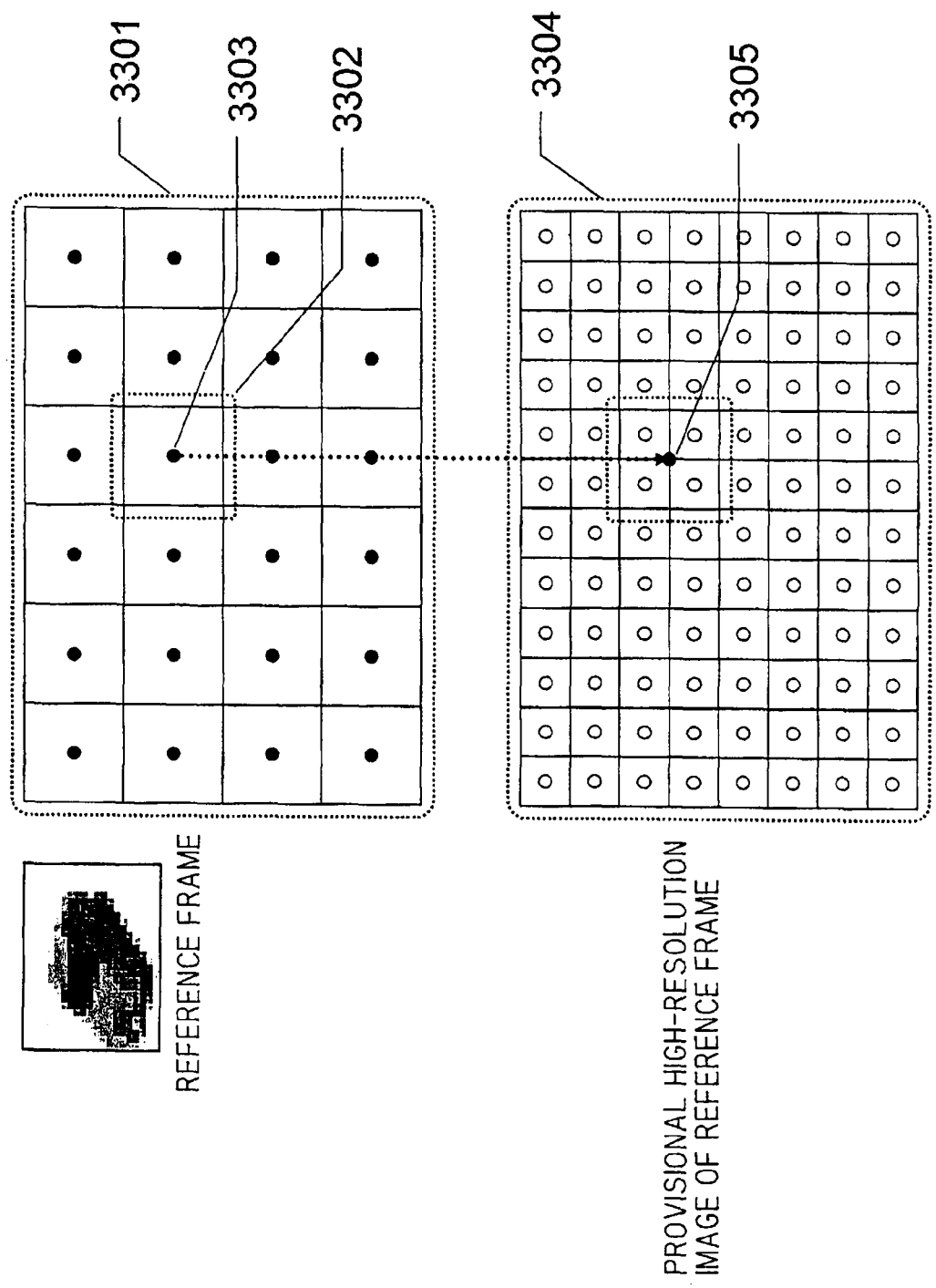
FIG. 33 illustrates a method of calculating the corresponding position of the target pixels in the screen space.

Referring now to FIG. 30, FIG. 31 and FIG. 33, operation to segment the region in the screen space by the region segmentation unit 102 in FIG. 1 and in Step S202 in FIG. 2 will be described in detail.

(4-1) Edge Region

FIG. 30 illustrates a state of detecting an edge region in which the change of the pixel values occurs linearly, such as a contour line of a shooting object.

Whether or not a target pixel A102 in a low-resolution image frame A101 is a pixel included in the edge region is determined. The block areas arranged in 3×3 around the target pixel are assumed to have pixel values of y11, y12, . . . , y33, respectively.

In general, in a case in which the value obtained by differentiating the change of the pixel value at the target pixel A102 is larger than a certain value, it is determined to be a pixel included in the edge region. The value after differentiation is calculated by using Sobel filter. In order to obtain the value of transverse differentiation, a transverse Sobel filter A103 is applied to the target pixel A102.

More specifically, $(-y11-2 \times y21-y31)+(y13+2 \times y23+y33)$ is calculated as the transverse differentiation of the target pixel A102. In the same manner, in order to obtain the value of vertical differentiation, a vertical Sobel filter A104 is applied to the target pixel A102. More specifically, $(y11+2 \times y12+y13)+(-y31-2 \times y32-y33)$ is calculated as the vertical differentiation of the target pixel A102. The absolute value of the vertical differentiation and the absolute value of the transverse differentiation are added, and if the sum is larger than a certain threshold value, the target pixel A102 is determined to be a pixel included in the edge region.

(4-2) Texture Region

FIG. 31 illustrates a state of detecting a texture region including a large number of pixels whose pixel value is changed significantly in a local area such as fine patterns like webbing of a sweater or lawn.

Whether or not a target pixel A202 of a low-resolution image frame A201 is a pixel included in the texture region is determined. A local area arranged in 3×3 around the target pixel are assumed to have pixel values of y11, y12, . . . , y33, respectively.

Firstly, a transverse finite difference A203 in the local area is calculated as:

absolute value of $dx11=(y11-y12)$;
absolute value of $dx12=(y12-y13)$;
absolute value of $dx21=(y21-y22)$;
absolute value of $dx22=(y22-y23)$;
absolute value of $dx31=(y31-y32)$; and
absolute value of $dx32=(y32-y33)$.

A vertical finite difference A204 in the local area is calculated as:

absolute value of dy11=(y11−y21);
absolute value of dy12=(y12−y22);
absolute value of dy13=(y13−y23);
absolute value of dy21=(y21−y31);
absolute value of dy22=(y22−y32); and
absolute value of dy23=(y23−y33).

In these amounts of finite difference, the number of the amounts of finite difference which is larger than a certain threshold value is counted, and when the counted number is larger than a certain threshold value, the target pixel A202 is determined as the pixel included in the texture region.

(4-3) Flat Region

Referring now to FIG. 31, a method of detecting a flat region in which the change of the pixel values in the local area is small will be described.

In order to determine whether or not the target pixel A202 is a pixel included in the flat region, the amounts of difference of the vertical difference A203 and the transverse finite difference A204 in the local area are added, and when the sum is lower than the threshold value, it is determined to be a pixel included in the flat region.

(4-4) Result of Separation

Figure 32:
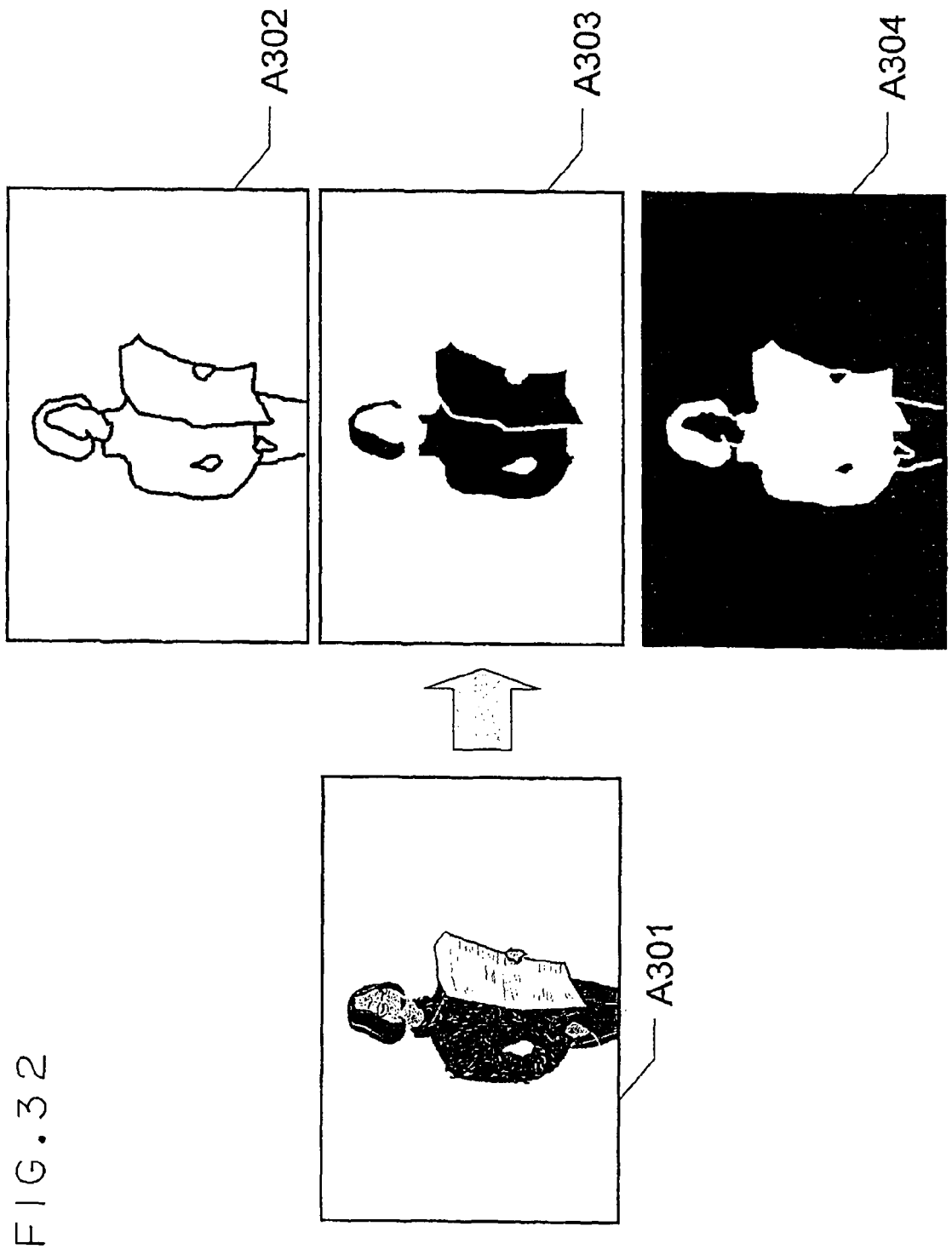
FIG. 32 is a drawing showing an example of a result of separation.

FIG. 32 illustrates an example of the result of separation.

When a low-resolution image frame A301 is entered, the contour of the shooting object is detected as an edge region A302, the sweater and hair are detected as a texture region A303 and the background and the trousers are detected as a flat region A304.

(5) Description of Corresponding Position Calculating Unit 103

Referring now to FIG. 9 to FIG. 14, operation to calculate corresponding positions in the screen space by the corresponding position calculating unit 103 in FIG. 1 and in Step S203 in FIG. 2 will be described in detail.

In the first embodiment, the function of the corresponding position calculating unit 103 is mounted in LSI as described above. Therefore, calculation of the respective corresponding positions described below is carried out for all the pixels in the reference frame. Then, selection of the corresponding positions is carried out in a method obtained below according respectively to the edge region and the texture region segmented in the procedure shown above.

Among others, a first method of calculating corresponding positions and a second method of calculating corresponding positions are methods selected for the edge region, and a third method of calculating corresponding positions are selected for the edge region and the texture region.

Figure 9:
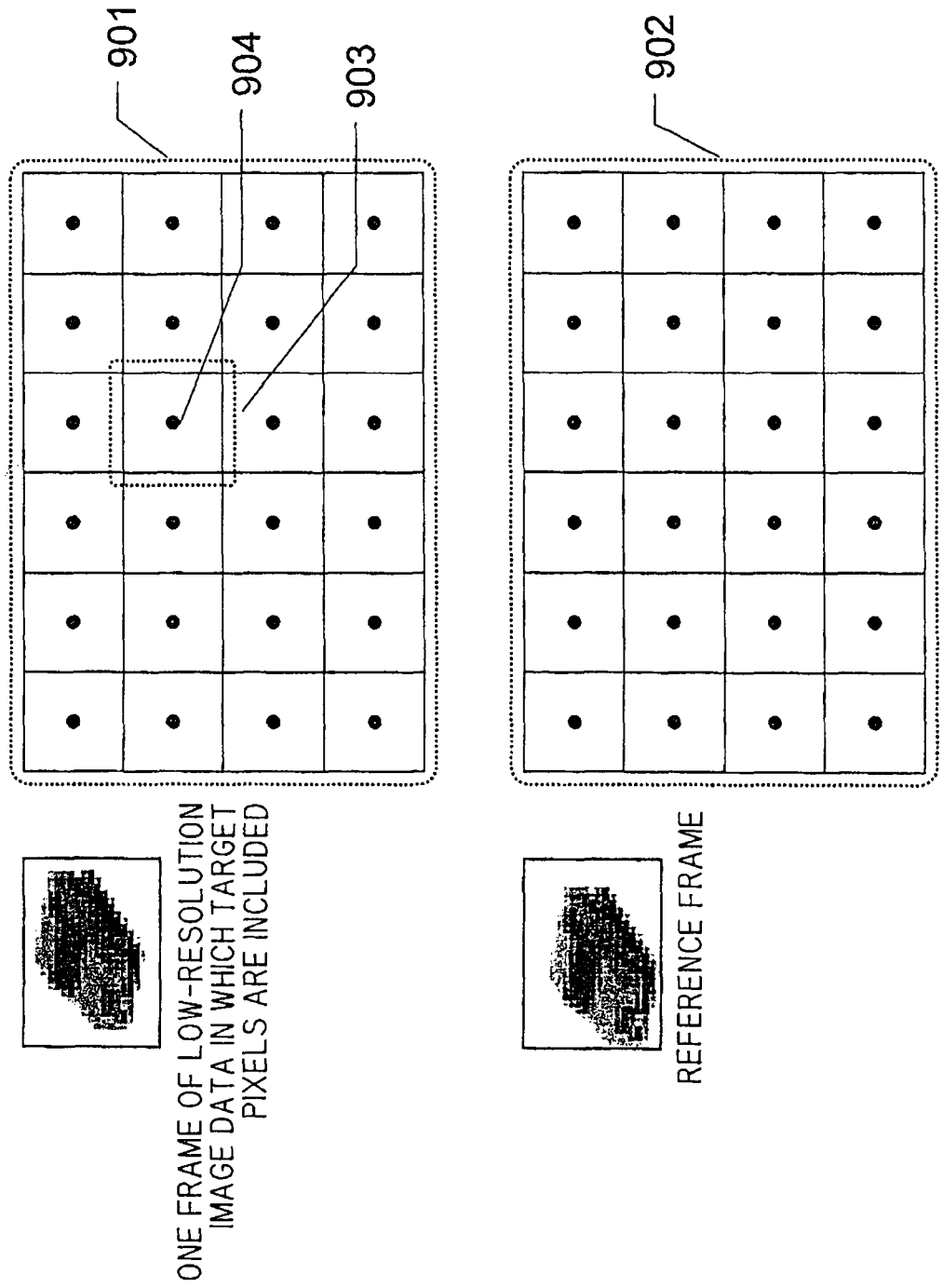
FIG. 9 illustrates a target pixel and a reference frame in the course of calculating a corresponding position in a screen space.

FIG. 9 illustrates two consecutive frames 901 and 902 in time sequence of a moving image of a moving vehicle. Here, a case in which the resolution is enhanced with the frame 902 as a reference frame from these low-resolution image frames will be described.

To which position a sample point 904 of a target pixel 903 in the low-resolution image frame 901 corresponds in the reference frame 902, that is, the corresponding position is calculated in decimal accuracy, which is finer than the pixel intervals.

The low-resolution image frames 901 and 902 are represented as if they have twenty-four pixels arranged in six pixels in the transverse direction and four pixels in the vertical direction as described in conjunction with FIG. 5 or FIG. 7 for eye-friendliness. However, the video of SD size, for example, actually has 720 pixels in the transverse direction and 480 pixels in the vertical direction.

(5-1) First Method of Calculating Corresponding Positions

Figure 10:
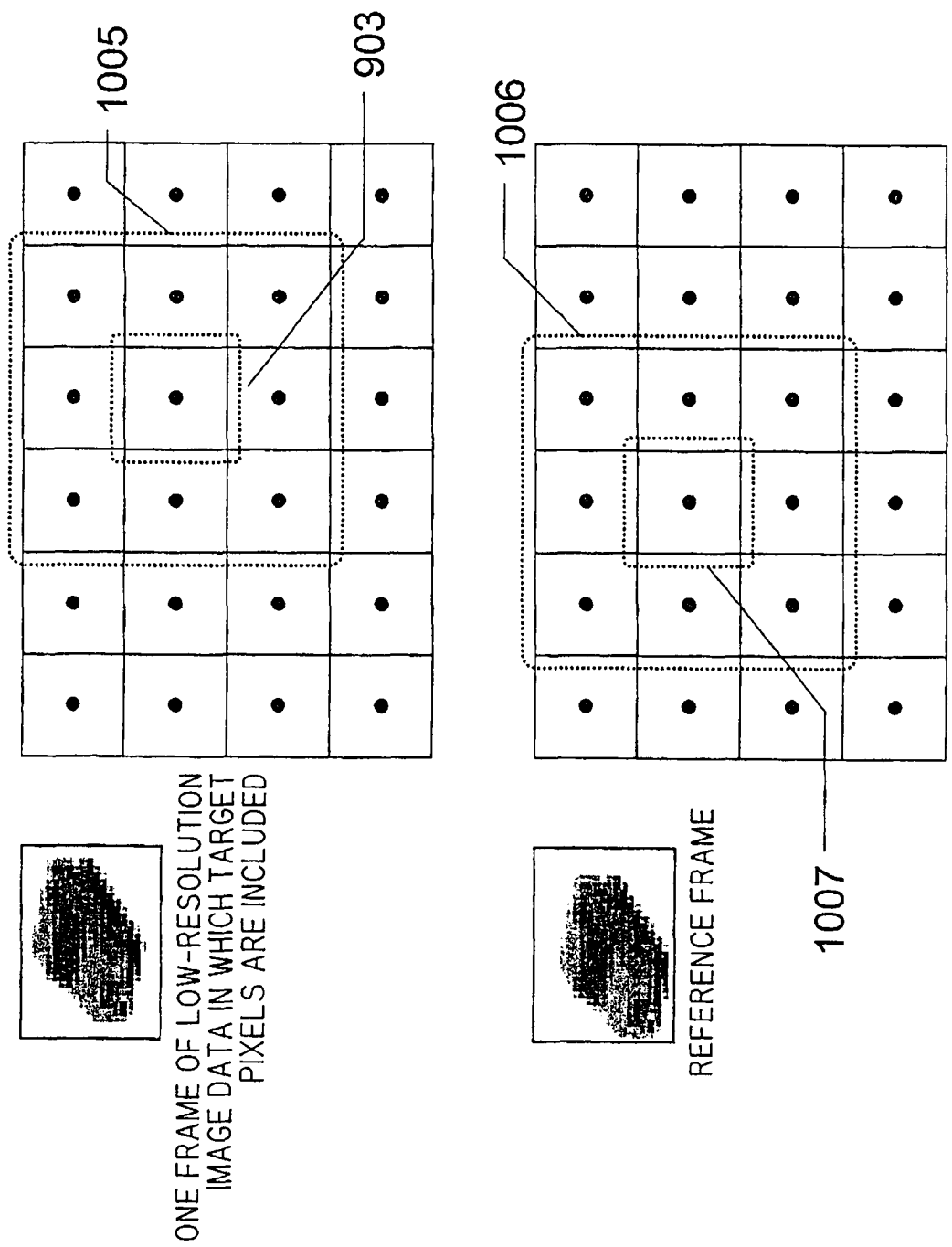
FIG. 10 illustrates a target image area and an image area in the course of calculating the corresponding position in the screen space.
Figure 11:
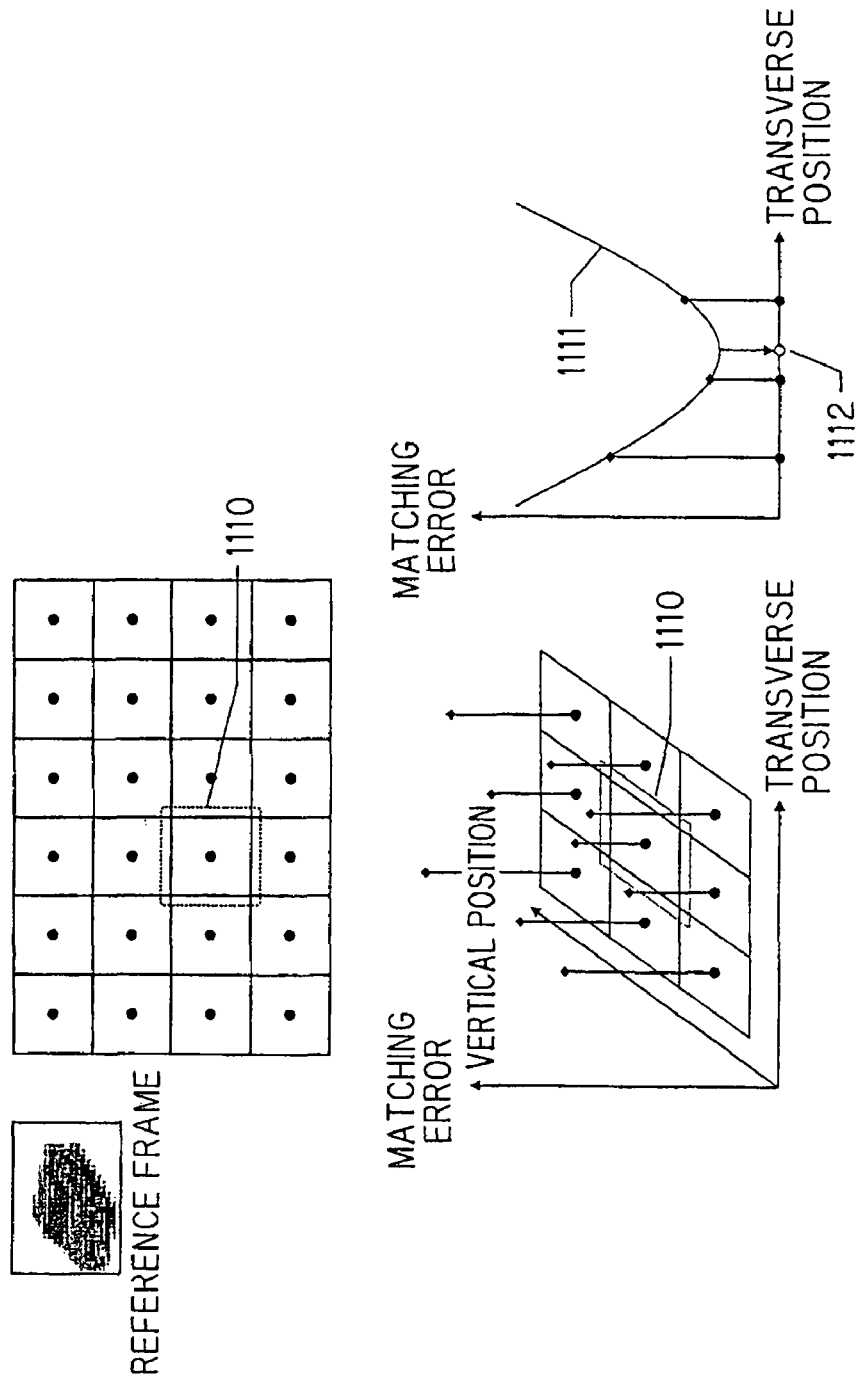
FIG. 11 illustrates matching error interpolation in the course of calculating the corresponding position in the screen space.
Figure 12:
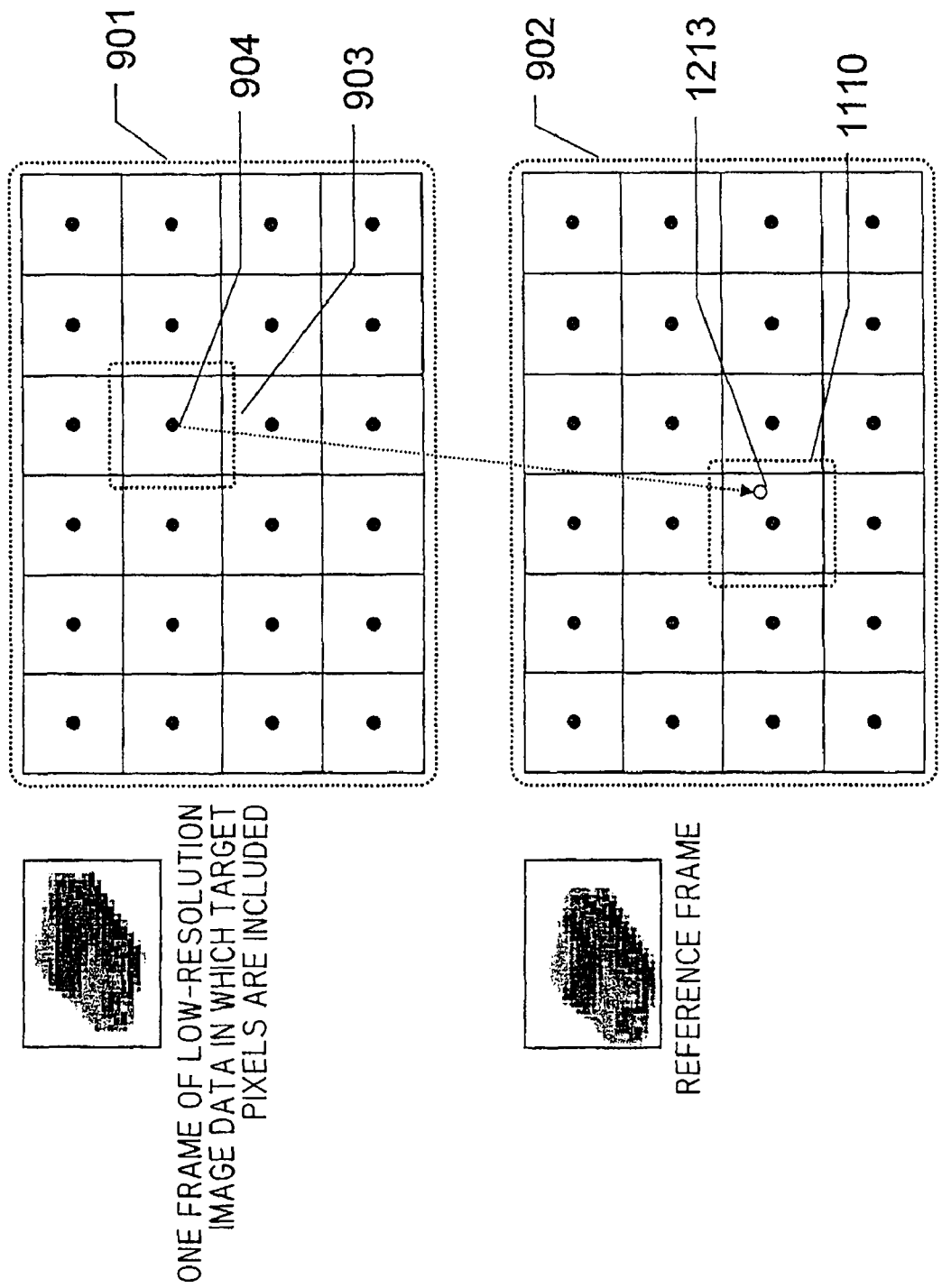
FIG. 12 illustrates a corresponding position in the reference frame in the course of calculating the corresponding position in the screen space.

Referring now to FIG. 10 to FIG. 12, a method of calculating corresponding positions in a decimal accuracy using a matching error interpolation will be described.

(5-1-1) Matching Error Interpolation

As shown in FIG. 10, as a first step in the matching error interpolation, in order to calculate matching errors between frames from the low-resolution image frame 901 to the reference frame 902 in accuracy of the pixel intervals as in the block matching method, several square pixels with the target pixel 903 at the center, for example, a square block 1005 with 5×5 pixels or 3×3 pixels is taken out from the low-resolution image frame 901 as a target image area.

Subsequently, a portion presenting a similar pattern in the change of the pixel values to the target image area 1005 is searched from the reference frame 902. As matching errors calculated on the basis of the pixel intervals, an SSD (Sum of Square Distance), which is a sum of squares of the differences of the respective pixel values in the target pixel areas between the frames, or a SAD (Sum of Absolute Distance) which is a sum of absolute values of the differences of the respective pixel values may be employed. Here, the SAD of the target image area 1005 included in the low-resolution image frame 901 and an image area 1006 included in the reference frame 902 is calculated to calculate the matching errors between the target pixel 903 and a pixel 1007.

In the same manner, the matching errors in the pixel intervals are also calculated for other pixels in the reference frame 902 by calculating the matching errors.

A pixel having the minimum matching error from among the respective matching errors is defined as a corresponding position calculated in the block matching method. This corresponds to a corresponding position in the pixel intervals, that is, in integer accuracy.

(5-1-2) Determination of Corresponding Position

FIG. 11 is a drawing showing that a pixel 1110 in the reference frame 902 is obtained as the corresponding pixel of the target pixel 903 in the low-resolution image frame 901.

A graph shown in FIG. 11 is a graph showing the matching errors calculated at the respective pixels for 3×3 pixels around the corresponding pixel 1110. The matching error of the corresponding pixel 1110 is a minimum matching error from among nine matching errors.

First of all, calculation of the corresponding positions in the transverse direction will be described.

A symmetrical continuous function 1111 is applied to matching errors of the corresponding pixel 1110 and pixels adjacent on both sides in the transverse direction. The symmetrical continuous function may be a parabola or two straight lines symmetrical about an axis of the matching error.

A transverse position (shown in a hollow circle) at which the continuous function applied in this manner is referred to as a corresponding position 1112 in decimal accuracy.

As regards the vertical direction, the corresponding position in the vertical direction is calculated as well.

The corresponding positions in the transverse direction and the vertical direction may be simultaneously calculated by applying symmetrical curved surface instead of calculating the corresponding positions in the transverse direction and the vertical direction separately.

(5-1-3) Corresponding Positions in Decimal Accuracy

FIG. 12 illustrates that the corresponding positions in decimal accuracy are calculated by applying above-described operation.

As shown in FIG. 12, the corresponding pixel 1110 in the reference frame 902 to which the target pixel 903 of the low-resolution image frame 901 corresponds from the two consecutive low-resolution image frame 901 and the reference frame 902 in time sequence is obtained, and a continuous function is applied thereto, so that a corresponding position 1213 in the reference frame 902 to which the sample point 904 of the target pixel 903 corresponds is calculated.

(5-2) Second Method of Calculating Corresponding Position

Figure 13:
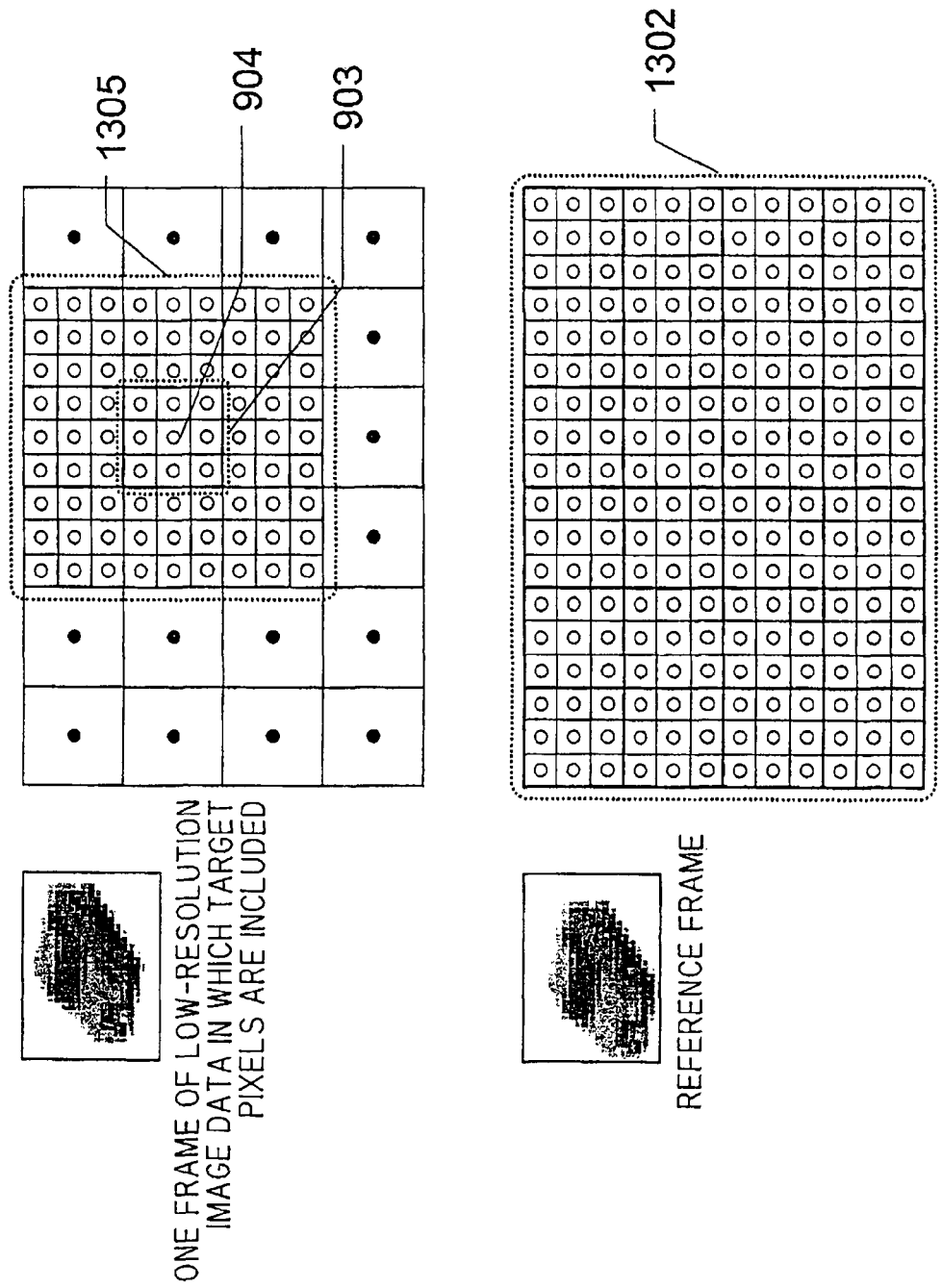
FIG. 13 illustrates oversampling method in the course of calculating the corresponding position in the screen space.
Figure 14:
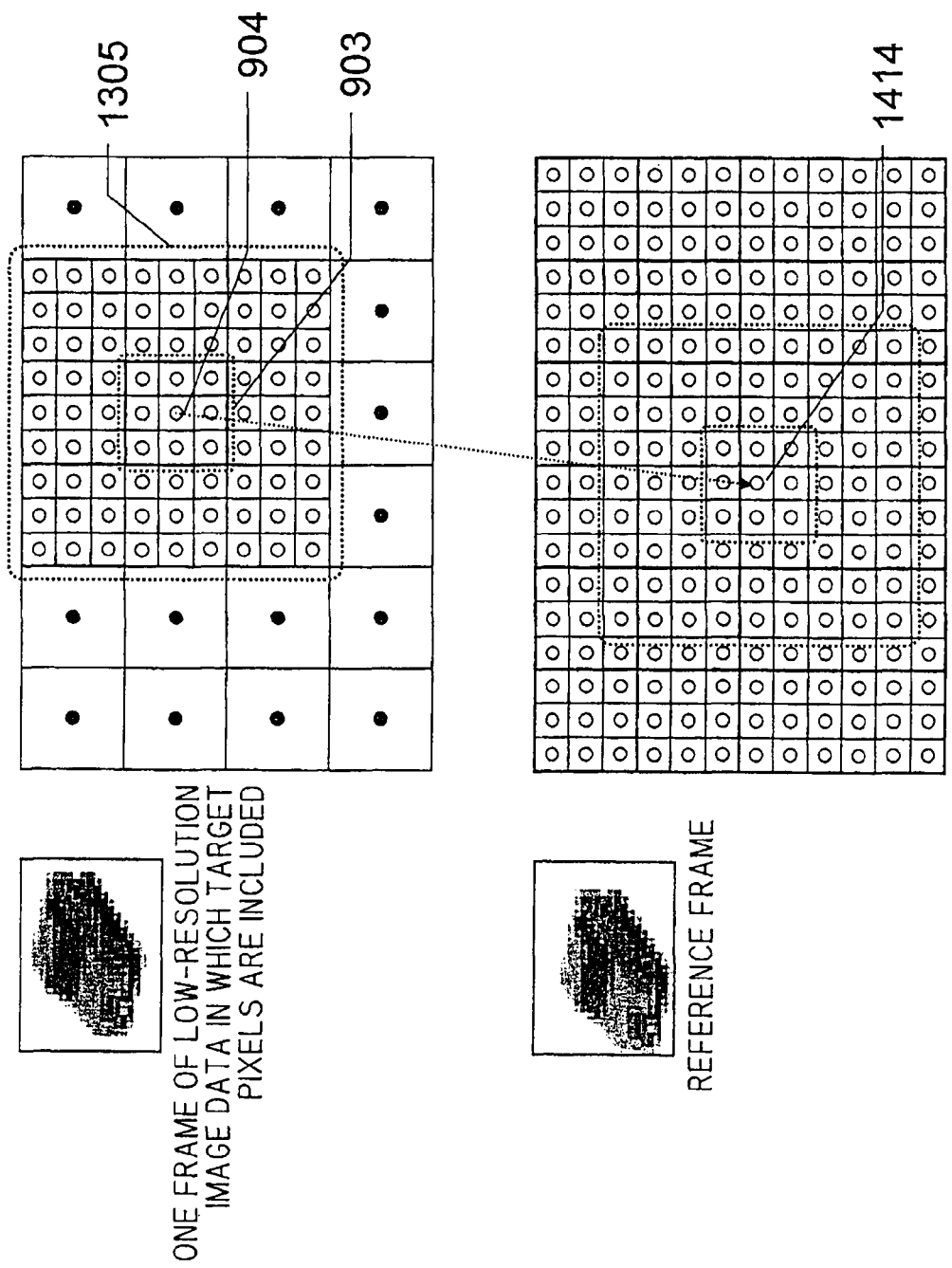
FIG. 14 illustrates a corresponding pixel oversampled to the reference frame in the course of calculating the corresponding position in the screen space.

Referring now to FIG. 13 and FIG. 14, a method of calculating corresponding positions in decimal accuracy using an oversampling method will be described.

(5-2-1) Oversampling Method

As shown in FIG. 13, as a first step in the oversampling method, the resolution of the target image area 1005 including the target pixel 903 is enhanced to generate a high-resolution target image area 1305.

Then, the resolution of the respective pixels in the low-resolution reference frame 902 (see FIG. 9) is enhanced to generate a high-resolution reference frame 1302. For example, the enhancement of the resolution is achieved by using interpolation through filtering with Sinc function on the basis of the sampling theorem (cubic convolution, BiCubic method) etc.

In this case, the resolution is enhanced three times in the transverse direction and three times in the vertical direction. In the high-resolution target image area 1305 and the high-resolution reference frame 1302, the corresponding pixels in accuracy of pixel intervals are calculated as in the block matching method as described in FIG. 10 in conjunction with the matching error interpolation.

Since the resolution of the low-resolution frame is enhanced to three times in the vertical direction and three times in the transverse direction, that is, since the corresponding pixels are detected with ⅓ the pixel intervals, it is equivalent to the fact that the corresponding positions are detected at fine accurate, that is ⅓ the low-resolution image intervals.

(5-2-2) Corresponding Positions in Decimal Accuracy

In FIG. 14, the corresponding positions in decimal accuracy are detected specifically through the oversampling method.

The matching errors for the pixels in the reference frame at the high-resolution pixel intervals are calculated through the high-resolution target image area 1305. The target point 1414 of a pixel having a minimum matching error is calculated as a corresponding position of the sample point 904 of the target pixel 903 in decimal accuracy in the reference frame.

(5-3) Third Method of Calculating Corresponding Positions

The third method of calculating corresponding positions is used in a case in which a target pixel 3302 is set in a reference frame 3301 as shown in FIG. 33, and calculates which position in a provisional high-resolution image 3304 in the reference frame a sampling point 3303 corresponds. The third method of calculating corresponding positions is a method of being selected in the edge region and the texture region.

When the position of the sample point on the upper left of the low-resolution reference frame 3301 is assumed to be (0, 0) and the intervals of the sample points thereof are assumed to be 1, and the position of the sample point on the upper left of the provisional high-resolution image 3304 of the reference frame is assumed to be (0, 0) and the intervals of the sample points thereof are assumed to be 1. Since the movement of the corresponding positions of the target pixels in the reference frame is 0, all what have to be done is just to convert the coordinate according to the magnification ratio $\alpha$ in the transverse direction and the magnification ratio $\beta$ in the vertical direction. Therefore, when the coordinate of the sample point 3303 of the target pixel 3302 in the low-resolution reference frame is assumed to be (x_LR, y_LR), the coordinate of a corresponding position 3305 in the provisional high-resolution image 3304 in the reference frame (x_HR, y_HR) is uniquely determined as:

x_HR=$\alpha$×(x_LR+0.5)−0.5; and
y_HR=$\beta$×(y_LR+0.5)−0.5. In FIG. 33,
$\alpha=\beta=2$, (x_LR, y_LR)=(3, 1) and hence is calculated by the expression shown above as;
(x_HR, y_HR)=(6.5, 2.5).

(6) Description of Pixel Value Converting Unit 104

Figure 15:
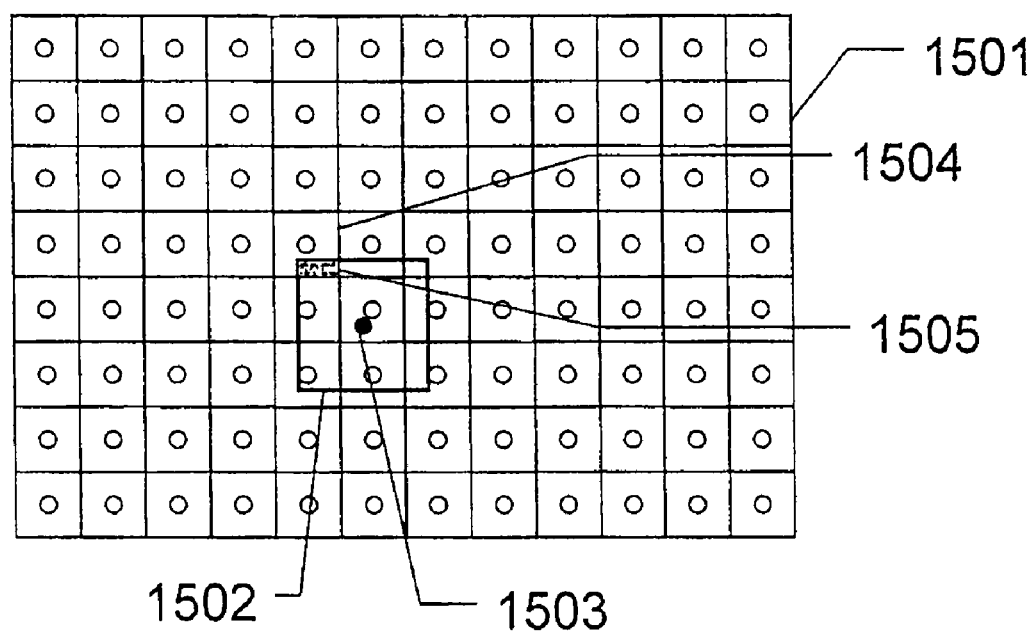
FIG. 15 illustrates a state of converting the pixel value in a provisional high-resolution image.

Referring now to FIG. 15, conversion of the pixel values in the provisional high-resolution image performed by the pixel value converting unit 104 in FIG. 1 in Step S204 in FIG. 2 will be described in detail with embodied example.

In FIG. 15, the pixel value calculating unit 101 in FIG. 1 enhances the resolution of the low-resolution reference frame 902 in FIG. 9 by two times in the vertical direction and two times in the transverse direction, and obtains the pixel values of the respective pixels (hollow circle) in a provisional high-resolution frame 1501.

The corresponding position calculating unit 103 calculates a corresponding position 1503 of a target pixel 1502 as a solid circle. The target pixel 1502 has a pixel value which is correct already in shot low-resolution image data in which the target pixel is included.

(6-1) First Step

Firstly, required corresponding positions are selected from all the corresponding positions in the area information calculated by the region segmentation unit 102.

Here, the corresponding positions of the target positions represent corresponding positions of the respective pixels in the low-resolution image frame in the reference frame, whose movement to the provisional high-resolution image is zero. In general, the detection accuracy of the corresponding positions in the edge regions is high. Since the corresponding positions of the target pixels only in the reference frame have no movement, the corresponding positions are calculated always correctly.

More specifically, when the area in which the target pixels are included is the edge region, corresponding positions determined through at least a method selected from the first method of calculating corresponding position to the third method of calculating corresponding position described above are selected. When two or more methods of calculating corresponding position are selected, the pixel values are modified for the respective corresponding positions in the method shown below.

When the area in which the target pixels are included is the texture region, the corresponding positions determined through the third method of calculating the corresponding position described above is selected.

When the area in which the target pixels are included is the flat region, the pixel values of the provisional high-resolution image data may be used as is, so that the pixel value conversion on the basis of the corresponding positions is not necessary.

In another method of selecting the corresponding position, for example, only the corresponding positions of the target pixels in the non-flat region are selected. Alternatively, in another method of selecting the corresponding position, for example, only the corresponding positions of the target pixels in the texture region are selected.

(6-2) Second Step

Subsequently, when the corresponding positions are determined as described above, estimated pixel values of the pixels in the provisional high-resolution image frame are modified on the basis of the corresponding positions.

The pixel value converting unit 104 in FIG. 1 calculates provisionally the pixel value of a certain target pixel 1502 from the respective pixels (hollow circles) in a provisional high-resolution frame 1601 for evaluating the likelihood of the pixel values of the respective pixels (hollow circles) of the provisional high-resolution frame 1501 in Step S204 in FIG. 2.

In order to do so, calculation is done on the basis of nine pixels with which the target pixel 1502 overlaps in the provisional high-resolution frame 1501.

For example, the provisional calculation is achieved by obtaining a weighted average according to the area ratio. The weight of a pixel 1504 of the provisional high-resolution frame with respect to the pixel value may be the ratio of the surface area of a rectangle 1505 with respect to the surface area of the target pixel 1502 (=1). The rectangle 1505 is a portion of the target pixel 1502 overlapped with the pixel 1504 of the provisional high-resolution frame. The weighted average value is obtained from these nine pixel values with the surface areas of the rectangular portions of the nine pixels overlapped with the target pixel 1502 determined as weight, so that the pixel value of the target pixel 1502 is provisionally estimated from the pixel values of pixels (hollow circles) in the provisional high-resolution frame 1501.

If the provisional high-resolution frame at this time is correct, the pixel value of the provisionally estimated target pixel 1502 must match the pixel value of the shot correct target pixel 1502.

However, in general, in the case of enlargement through filtering in the related art by the pixel value calculating unit 101, they do not match because the shooting object in the screen is blurred, or a portion which is supposed to be a continuous straight line is expressed in a stepped manner which is called jaggy. Therefore, the amount of modification to be added to or subtracted from the pixel value in the provisional high-resolution frame is calculated so that they match.

In order to calculate the amount of modification, in a first step:

value of finite difference=(shot pixel value of target pixel)−(provisionally estimated pixel value of target pixel) is calculated. When the value of finite difference is distributed by the weight obtained by provisional calculation, the value of finite different will be zero.

The method of calculating the amount of modification in this manner is the POCS method (see Non-Patent Document 1 p. 29, p. 31).

Then, by adding nine positive or negative amounts of modification distributed by weight to the nine pixel values of the provisional high-resolution frame 1501, the finite difference of the target pixel calculated at that time will be zero, and hence the shot pixel value of the target pixel matches the provisionally estimated pixel value thereof.

However, depending on the corresponding positions of other target pixels, the pixel values in the same high-resolution frame 1501 may be modified by the modification using this method. Therefore, the modification is carried out for all the corresponding positions successively, and is further repeated by a predetermined number of times (Step S205).

With this repetition, the provisional high-resolution frame gets close gradually to a correct one, and hence the provisional high-resolution frame obtained by repeating the modification by a predetermined number of times is outputted as a high-resolution frame.

A method of calculating the amount of modification in the direction in which the value of finite difference is reduced instead of calculating to bring the value of finite difference to zero when calculating the amount of modification is an Iterative Back-Projection method (see Non-Patent Document 1, p. 29, p. 31).

Second Embodiment

Figure 16:
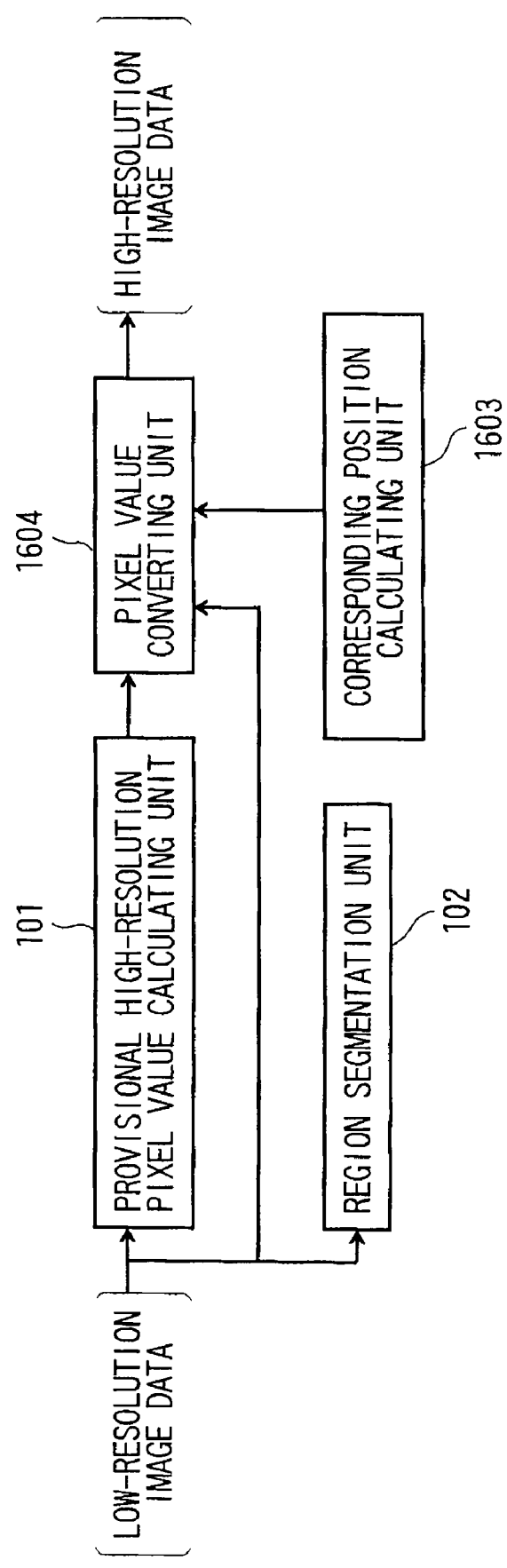
FIG. 16 is a block diagram of the image processing apparatus according to a second embodiment.

Referring now to FIG. 16, the image processing apparatus according to a second embodiment will be described.

The second embodiment is an example suitable for condition branching process using a PC (Personal Computer) or the like. On the other hand, the image processing apparatus according to the first embodiment is suitable for parallel process using the LSI or the like as described above.

FIG. 16 is a block diagram showing an image processing apparatus according to the second embodiment.

In the image processing apparatus according to the second embodiment, area information from the region segmentation unit 102 is supplied to a corresponding position calculating unit 1603, then the corresponding position calculating unit 1603 selects the entered area information and calculates the corresponding positions, and a pixel value converting unit 1604 converts pixel values without using the area information.

In other words, the second embodiment is different from the first embodiment in the following points.

In the first embodiment, the corresponding positions are obtained respectively through the first method of calculating corresponding positions to the third method of calculating corresponding positions described above for all the pixels in the reference frame. Then, on the basis of the type of the segmented regions (edge region, texture region and flat region), the corresponding positions determined through the first method of calculating corresponding positions to the third method of calculating corresponding positions are selected.

On the other hand, according to the second embodiment, the area is segmented into the edge region, the texture region and the flat region, and then the corresponding positions are obtained through a method selected from the first method of calculating corresponding positions to the third method of calculating corresponding positions depending on the type of the segmented region for the respective areas separately.

As other parts of the configuration are the same as the image processing apparatus in the first embodiment, the same parts are represented by the same reference numerals and the description is omitted.

Third Embodiment

Figure 17:
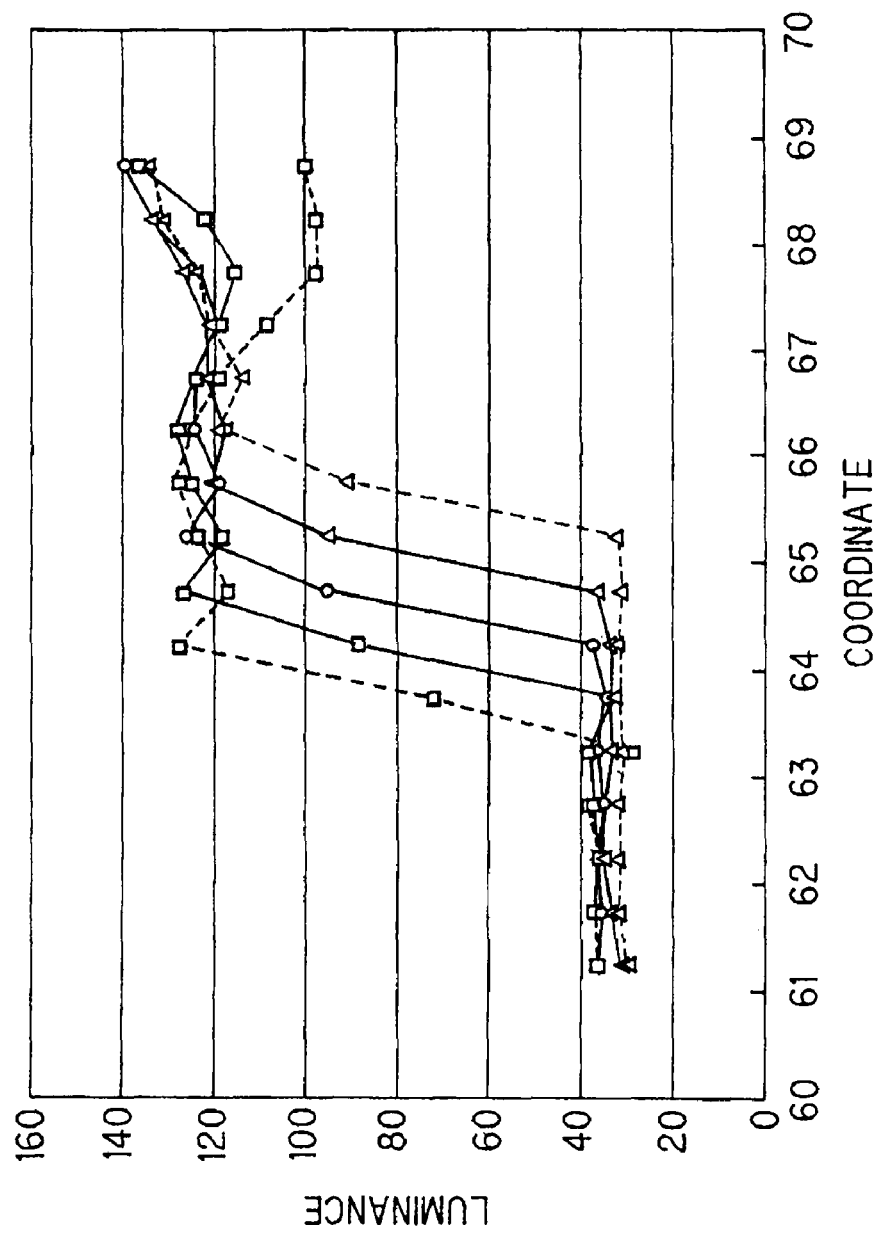
FIG. 17 illustrates self congruity of a local pattern in a third embodiment.
Figure 18:
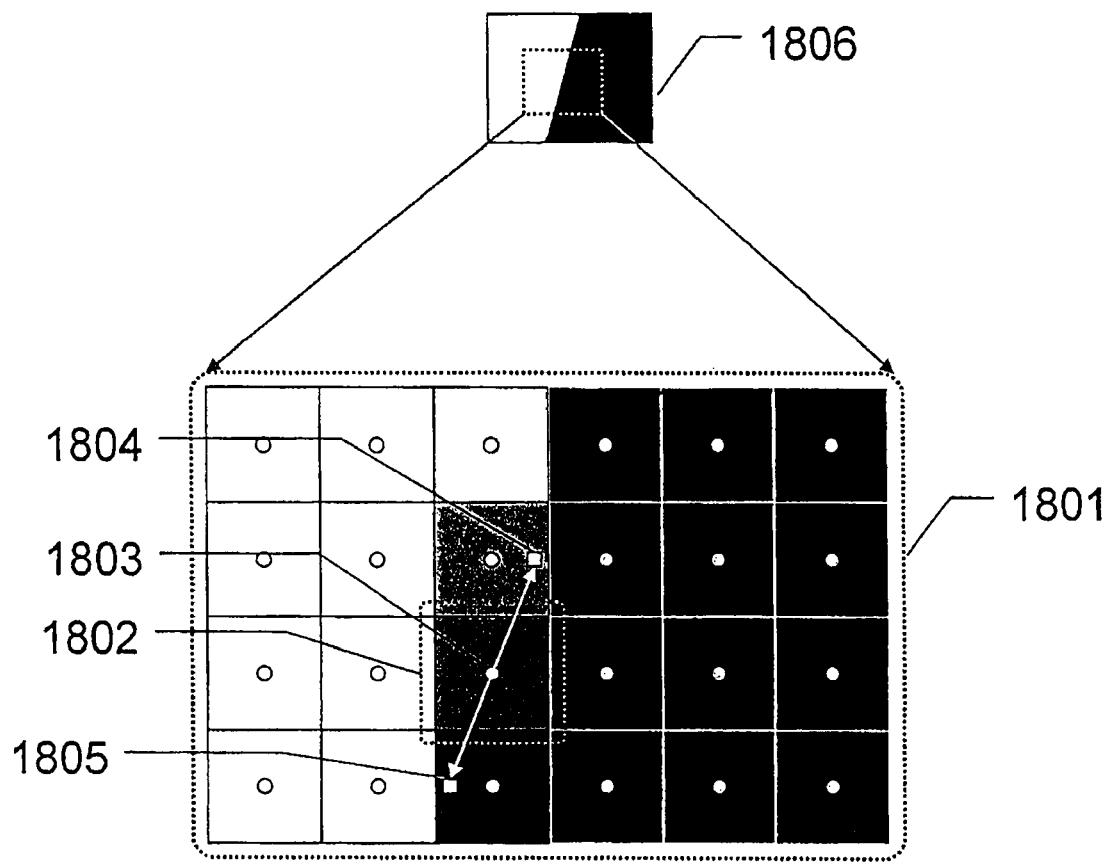
FIG. 18 illustrates a state of calculating the position of the self congruity in the screen space in the third embodiment.

Referring now to FIG. 17 and FIG. 18, the image processing apparatus according to a third embodiment of the invention will be described.

According to the first embodiment, the description has been given on the moving image data. The third embodiment may be applied to a case of a still image having no continuous frames arranged in sequence like the case of the moving image.

The third embodiment is applied to a case in which self congruity in the frame of a shooting image (in a reference frame) is utilized as operation to calculate the corresponding positions in the screen space by the corresponding position calculating units 103, 1603 in FIG. 1 and FIG. 16 in Step S203 in FIG. 2.

FIG. 17 is a graph of an actual digital image data, in which the lateral axis represents the lateral coordinates of a pixel, and the vertical axis represents the pixel value indicating luminance. Here, different five rows of data in the same frame are shown by separate sequential lines. As shown in FIG. 17, it is understood that there are portions which present very similar luminous changes even though they are different rows in the same frame. The nature of the image which presents the similar luminous change in the same frame as described above is defined as "self congruity".

In the process of enhancing the resolution using the self congruity in the frame of the shooting object, it is not necessary to store a plurality of continuous low-resolution image data in a memory. Therefore, it has an advantage that enhancement of the resolution is achieved with a small amount of memory.

The enhancement of the resolution using the self congruity in the deterioration inverse conversion method for in-frame processing is achieved by setting image data including a still image composed of one frame as a reference frame by the corresponding position calculating units 103, 1603 in Step S203, setting a plurality of pixels in the reference frame, for example, edge pixels in the reference frame as target pixels one by one in sequence and calculating one or more corresponding positions around the target pixels in decimal accuracy. This is achieved through calculation using the matching error interpolation or Oversampling method on the basis of the low-resolution image data.

FIG. 18 is an explanatory drawing showing an example in which the resolution of a low-resolution reference frame 1801 of a shooting object 1806 having a vertical edge is enhanced using the self congruity.

As shown in FIG. 18, reference numeral 1802 designates a target pixel, and reference numeral 1803 designates a sample point thereof. In Step S203 in FIG. 2, the position of self congruity existing around the sample point 1803 is calculated. Assuming that the position of self congruity exists one line above or one line below, positions of self congruity in decimal accuracy through the matching error interpolation or the oversampling method are a first position of self congruity 1804 and a second position of self congruity 1805.

By calculating the corresponding positions (positions of self congruity in this case) in decimal accuracy with respect to the target pixels in this manner, pixel values of the target pixels, and the reference frame of the target pixel, and then converting the pixel values of the provisional high-resolution image in Step S204 in FIG. 2, the sharp and high-speed enhancement of the resolution is achieved.

This method of enhancement of the image resolution is referred to as "in-frame deterioration inverse conversion method", hereinafter.

Fourth Embodiment

Figure 19:
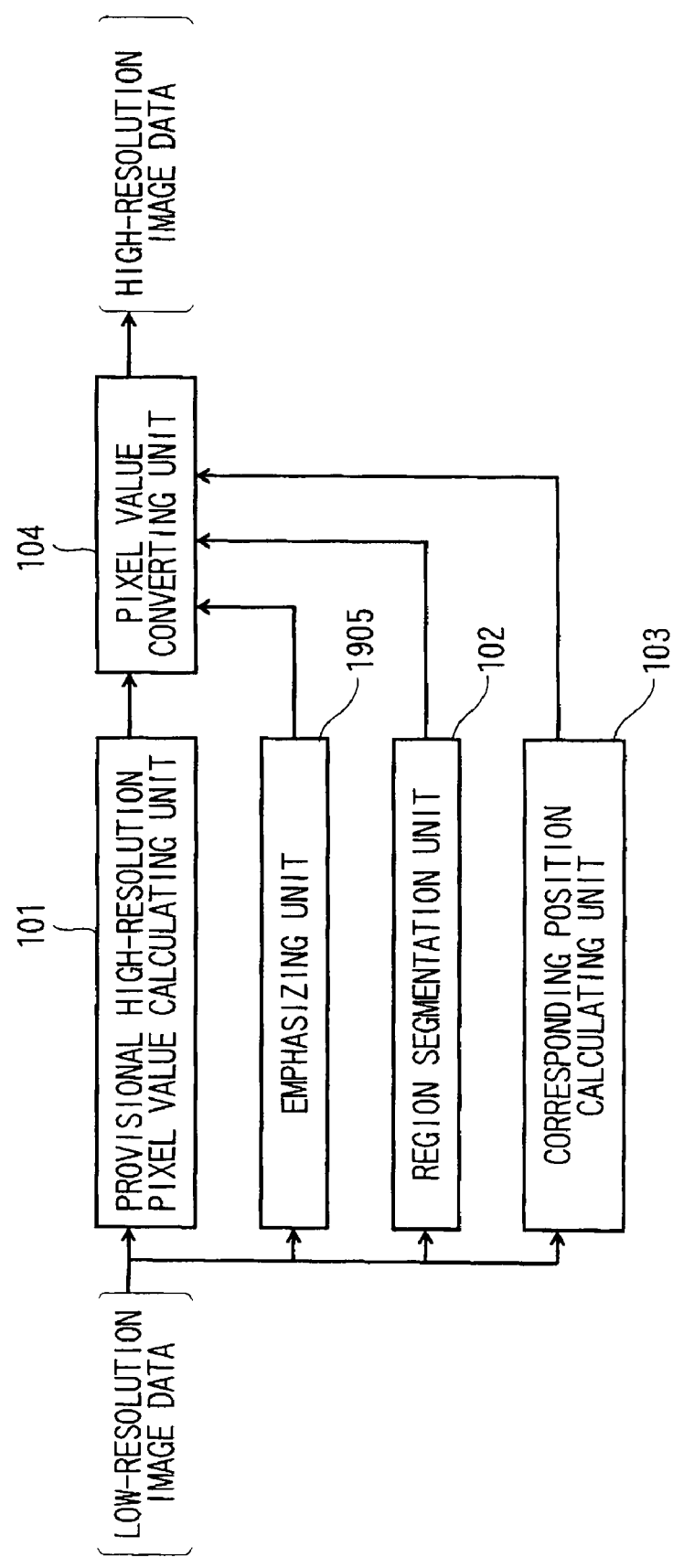
FIG. 19 is a block diagram of the image processing apparatus according to a fourth embodiment.
Figure 20:
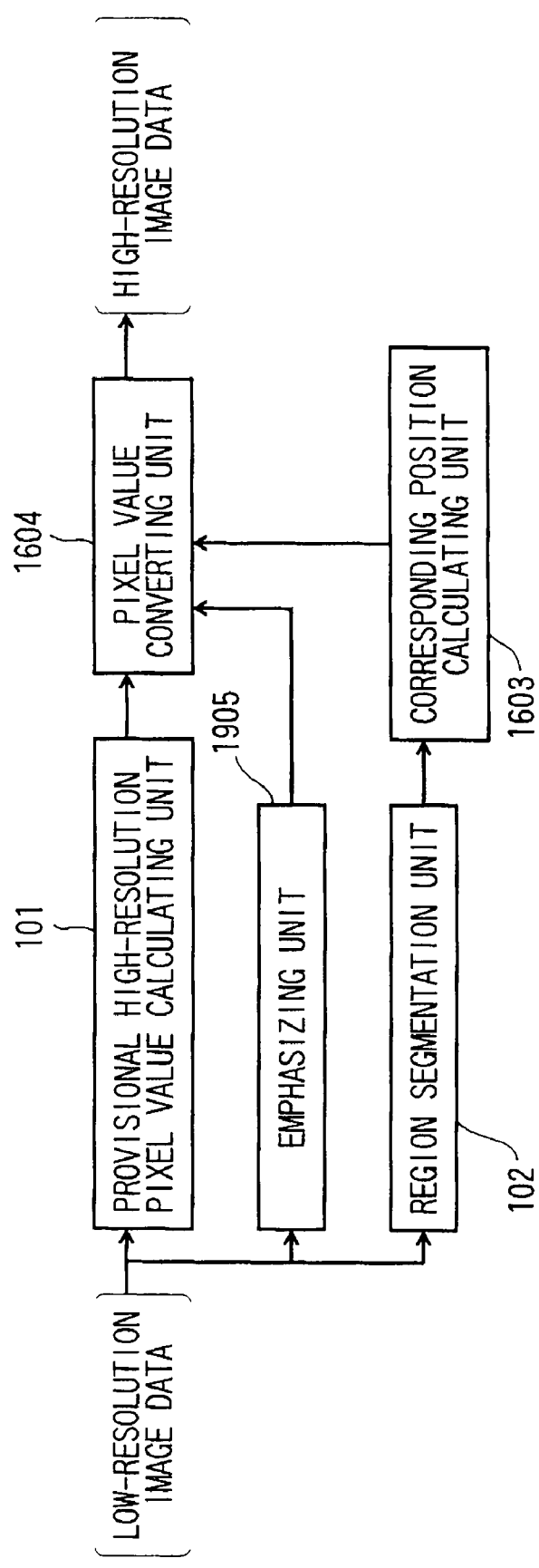
FIG. 20 is a block diagram of the image processing apparatus according to the fourth embodiment.

Referring now to FIG. 19 and FIG. 20, the image processing apparatus according to a fourth embodiment of the invention will be described.
(1) Configuration FIG. 19 and FIG. 20 are block diagrams showing the image processing apparatus according to the fourth embodiment.

The image processing apparatus emphasizes pixel values of low-resolution image data supplied to the pixel value converting units 104, 1604 in FIG. 1 and FIG. 16 by an emphasizing unit 1905. As other parts of configuration are the same as the image processing apparatus described in FIG. 1 and FIG. 16, the same parts are represented by the same reference numerals and the description will be omitted.

In the multi-frame deterioration inverse conversion method or the in-frame deterioration inverse conversion method, addition and subtraction are applied to the pixel values of the provisional high-resolution image to make the error between the pixel values of the target pixels and the estimated pixel values estimated from the pixel values of the provisional high-resolution image smaller according to the positions of the sample points of the provisional high-resolution image included in the target low-resolution pixels. However, when the low-resolution image is blurred, the sample points of the high-resolution image on the outside the target low-resolution pixels may affect the pixel values of the target pixels.

Figure 21:
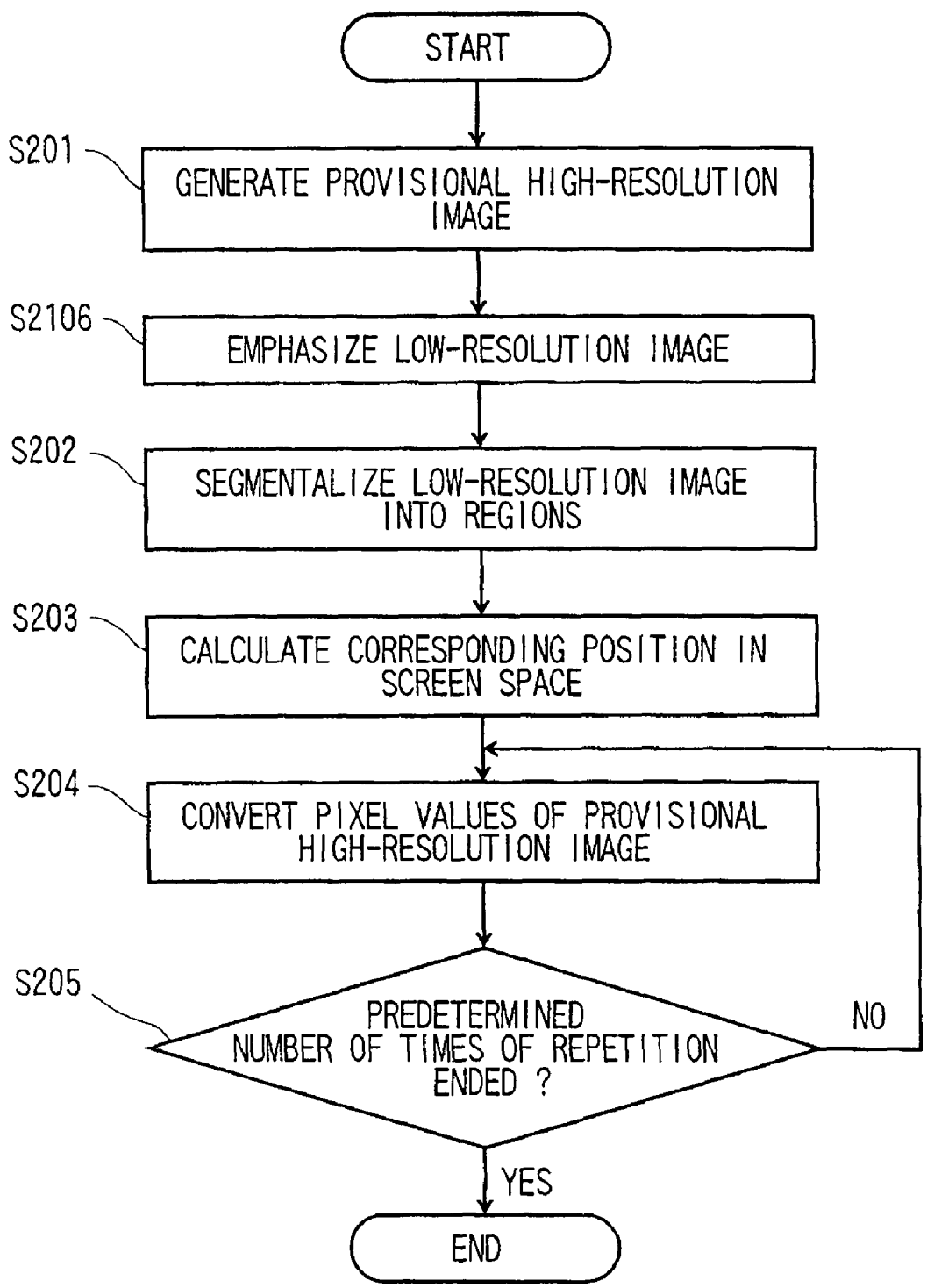
FIG. 21 is a flowchart showing an example of operation of the image processing apparatus according to the fourth embodiment.

The image processing apparatuses shown in FIGS. 19 and 20 receive supply of low-resolution image data, emphasize the pixel values of the image data, and output the same to the pixel value converting units 104, 1604. More specifically, an enhance filter such as an unsharp mask is used.
(2) Operation FIG. 21 is a flowchart for explaining the operation of the image processing apparatuses in FIG. 19 and FIG. 20. It is different from the flowchart in FIG. 2 in that a step of emphasizing the pixel values in the low-resolution image data is provided between the Step S201 and the Step S202, and other steps are the same as the flowchart in FIG. 2. Therefore, the same steps are represented by the same reference numerals and the description will be omitted.

As shown in FIG. 21, in the Step S2106, a low-resolution image data is supplied, and the pixel values of the image data are emphasized and outputted to the pixel value converting units 104, 1604.
(3) Advantages Accordingly, in the fourth embodiment, the blurring of the low-resolution image is alleviated, and the pixel values of the target pixels are generated from the sample points in the provisional high-resolution image included in the target low-resolution pixels. In addition, emphasis of jaggy of the provisional high-resolution image by the emphasis of the low-resolution image in advance may be avoided.

Fifth Embodiment

Figure 22:
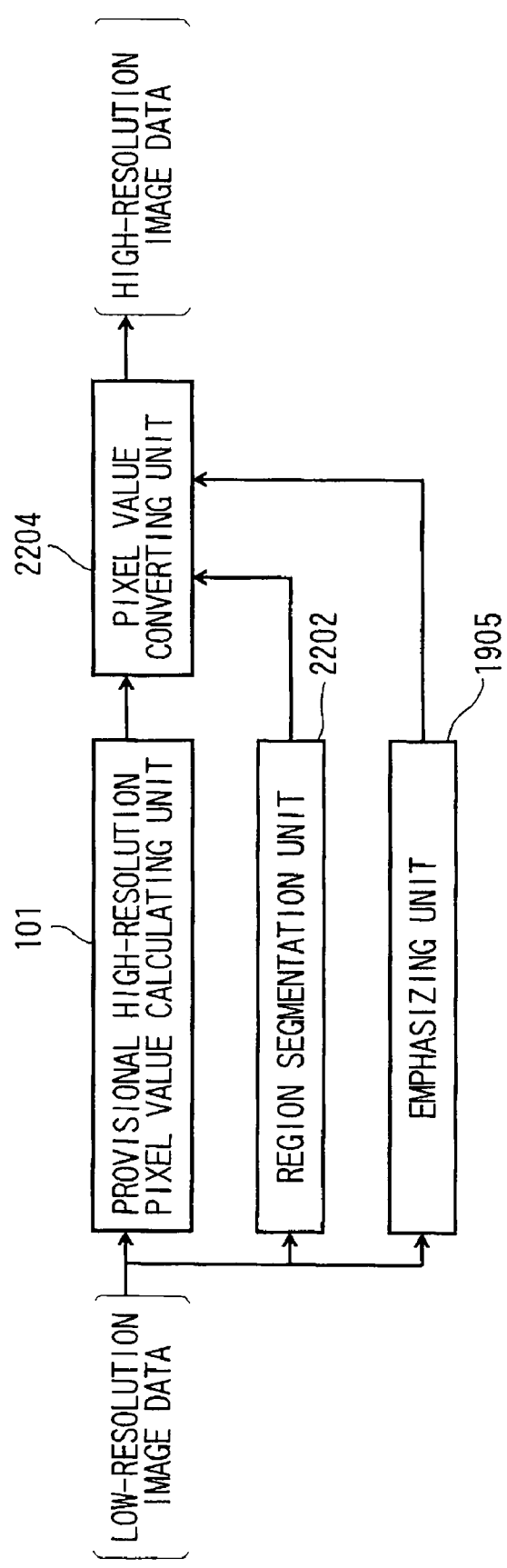
FIG. 22 is a block diagram showing the image processing apparatus according to a fifth embodiment.
Figure 23:
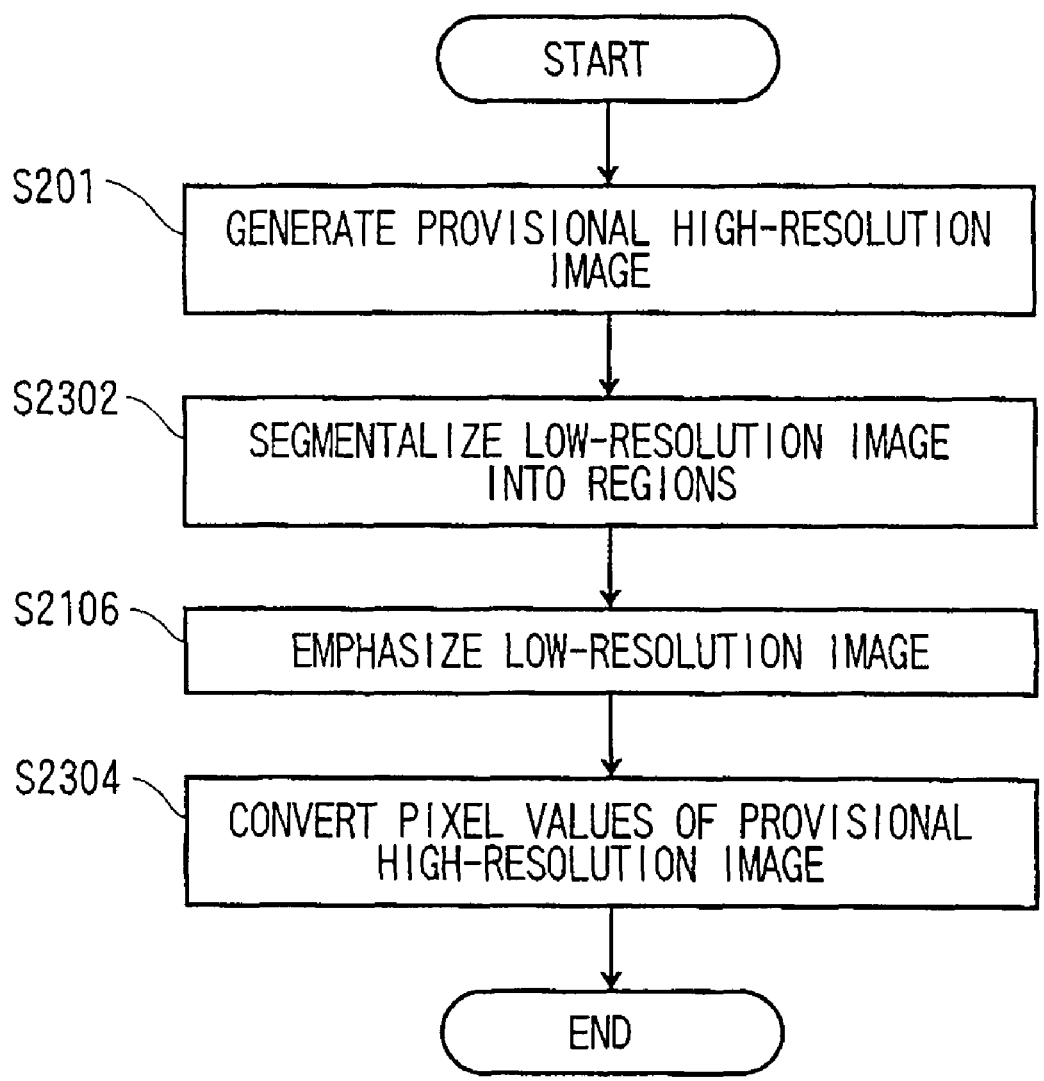
FIG. 23 is a flowchart showing an example of operation of the image processing apparatus according to the fifth embodiment.

Referring now to FIG. 22 and FIG. 23, the image processing apparatus according to a fifth embodiment of the invention will be described.
(1) Configuration FIG. 22 is a block diagram showing the image processing apparatus according to the fifth embodiment.

As shown in FIG. 22, the image processing apparatus includes the pixel value calculating unit 101, a region segmentation unit 2202, the emphasizing unit 1905 and a pixel value converting unit 2204.

The pixel value calculating unit 101 is operated as described in conjunction with FIG. 1.

The region segmentation unit 2202 receives a supply of a reference frame composed of one frame as a low-resolution still image, segmentalizes the reference frame into the flat region and the non-flat region on the basis of the change of the pixel values in the reference frame, and outputs the division information.

The emphasizing unit 1905 is operated in the same manner as described in conjunction with FIG. 19.

The pixel value converting unit 2204 receives a supply of a provisional high-resolution image, the area information and the enhanced reference frame, and replaces the pixel values of the provisional high-resolution image by interpolation on the basis of the pixel values of the non-flat region in the reference frame.
(2) Operation FIG. 23 is a flowchart for explaining operation of the image processing apparatus in FIG. 22.

The first Step S201 is the same as the process described in FIG. 2.

Subsequently, the region segmentation unit 2202 receives a supply of the reference frame composed of one frame as a low-resolution still image, segmentalizes the reference frame into the flat region and the non-flat region on the basis of the change of the pixel values in the reference frame, and outputs the division information (Step S2302).

The subsequent step S2106 is the same as the process described in conjunction with FIG. 21.

Subsequently, the pixel value converting unit 2204 receives a supply of a provisional high-resolution image, the area information in the reference frame and the enhanced reference frame, and replaces the pixel values of the provisional high-resolution image by interpolation on the basis of the pixel values of the non-flat region in the reference frame (Step S2304).

(3) Advantages

Accordingly, in the fifth embodiment, sharp enhancement of the resolution is achieved without emphasizing noise in the flat region.

Sixth Embodiment

Figure 24:
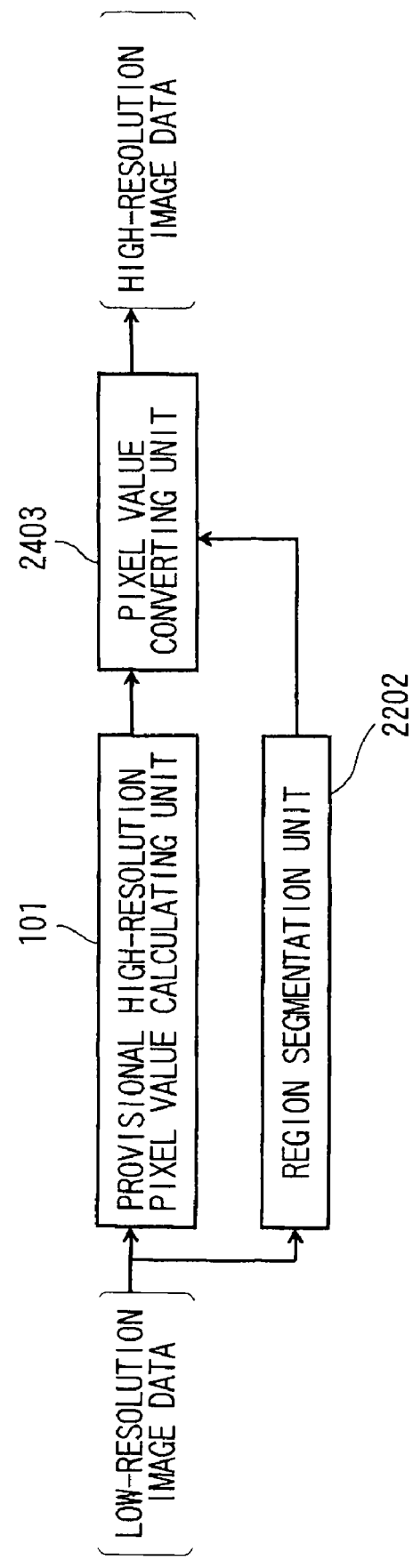
FIG. 24 is a block diagram showing the image processing apparatus according to a sixth embodiment.
Figure 25:
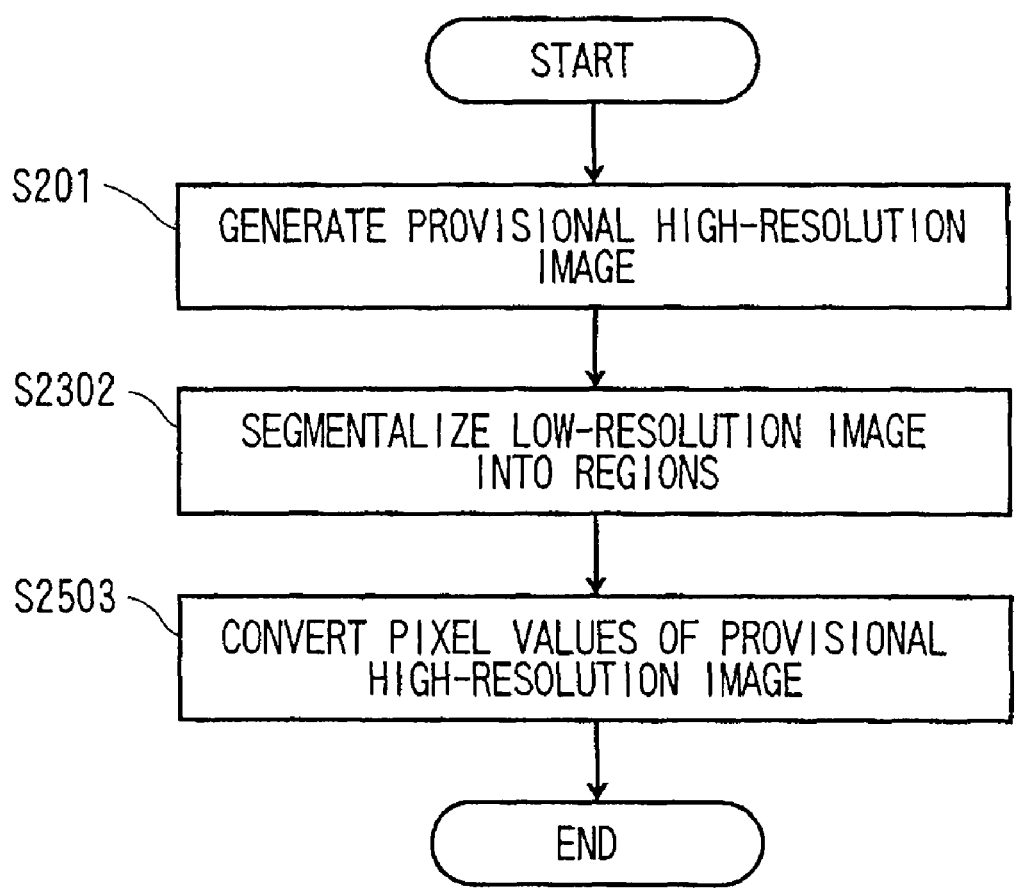
FIG. 25 is a flowchart showing an example of operation of the image processing apparatus according to the sixth embodiment.

Referring now to FIG. 24 and FIG. 25, the image processing apparatus according to a sixth embodiment will be descried.

(1) Configuration

FIG. 24 is a block diagram of the image processing apparatus according to the sixth embodiment.

As shown in FIG. 24, the image processing apparatus includes the pixel value calculating unit 101, the region segmentation unit 2202 and a pixel value converting unit 2403.

The pixel value calculating unit 101 is operated in the same manner as described in conjunction with FIG. 1.

The region segmentation unit 2202 is operated in the same manner as described in conjunction with FIG. 22.

The pixel value converting unit 2403 receives a supply of a provisional high-resolution image and area information of a reference frame, and emphasizes the pixel values of the provisional high-resolution image corresponding to the non-flat region in the reference frame. More specifically, the enhance filter such as the unsharp mask is used.

(2) Operation

FIG. 25 is a flowchart for explaining operation of the image processing apparatus in FIG. 24.

The first step S201 is the same process as described in conjunction with FIG. 2.

The subsequent step S2302 is the same process as described in conjunction with FIG. 23.

Subsequently, the pixel value converting unit 2403 receives a supply of the provisional high-resolution image and the area information in the reference frame, and emphasizes the pixel values of the provisional high-resolution image corresponding to the non-flat region in the reference frame (Step S2503).

(3) Advantages

Accordingly, in the sixth embodiment, sharp enhancement of the resolution is achieved without emphasizing noise in the flat region.

Seventh Embodiment

Figure 26:
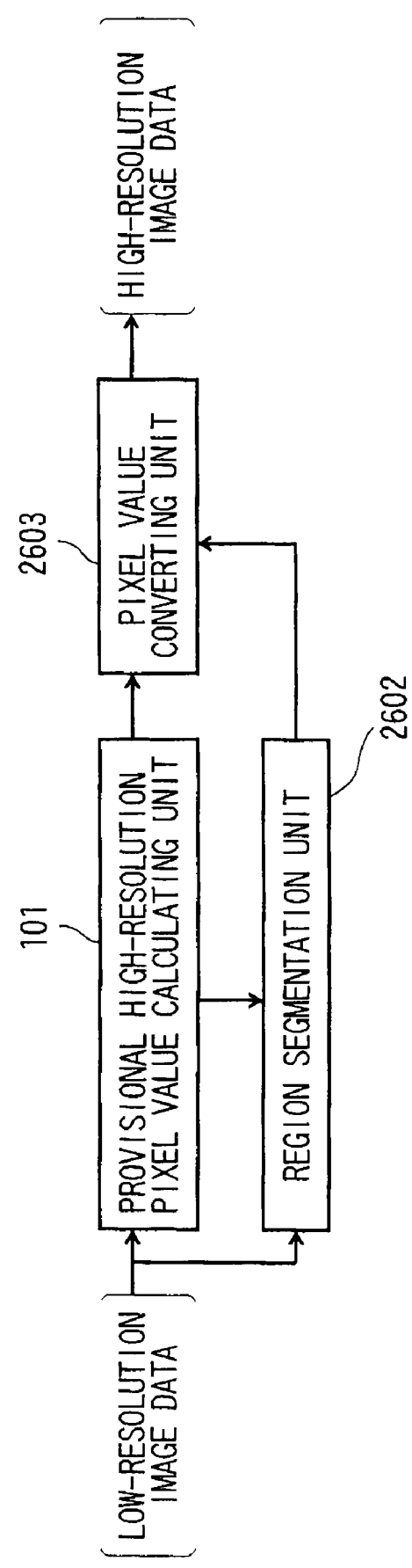
FIG. 26 is a block diagram of the image processing apparatus according to a seventh embodiment.
Figure 27:
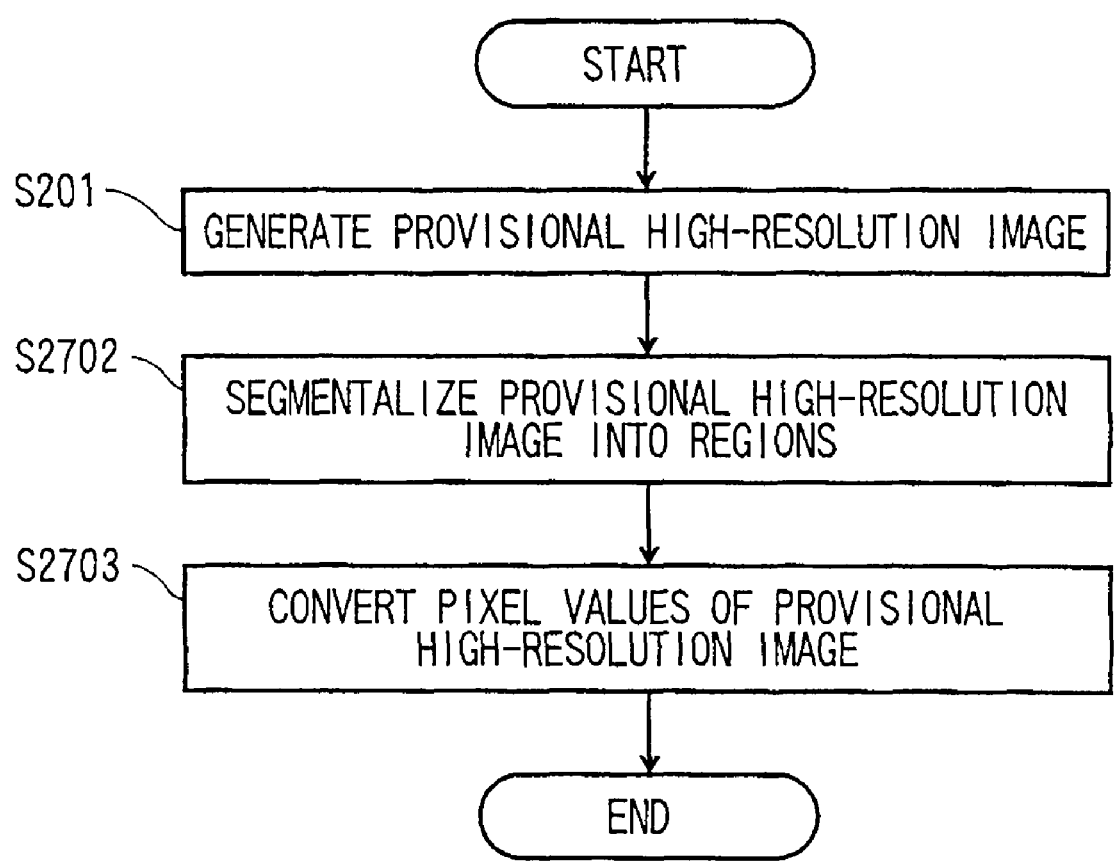
FIG. 27 is a flowchart showing an example of operation of the image processing apparatus according to the seventh embodiment.

Referring now to FIG. 26 and FIG. 27, the image processing apparatus according to a seventh embodiment of the invention will be described.

(1) Configuration

FIG. 26 is a block diagram showing the image processing apparatus according to the seventh embodiment.

As shown in FIG. 26, the image processing apparatus in this embodiment includes the pixel value calculating unit 101, a region segmentation unit 2602 and a pixel value converting unit 2603.

The pixel value calculating unit 101 is operated in the same manner as described in conjunction with FIG. 1.

The region segmentation unit 2602 receives a supply of a provisional high-resolution image, segmentalizes the provisional high-resolution image into the flat region and the non-flat region on the basis of the change of the pixel values in the provisional high-resolution image, and outputs division information.

The pixel value converting unit 2603 receives a supply of the provisional high-resolution image and the area information of the provisional high-resolution image, and emphasizes the pixel values in the non-flat region of the provisional high-resolution image. More specifically, the enhance filter such as the unsharp mask is used.

(2) Operation

FIG. 27 is a flowchart for explaining the operation of the image processing apparatus in FIG. 26.

The first step S201 is the same process as described in conjunction with FIG. 2.

Subsequently, the region segmentation unit 2602 receives a supply of the provisional high-resolution image, segmentalizes the provisional high-resolution image into the flat region and the non-flat region on the basis of the change of the pixel values in the provisional high-resolution image, and outputs division information (Step S2702).

Subsequently, the pixel value converting unit 2603 receives a supply of the provisional high-resolution image and the area information of the provisional high-resolution image, and emphasizes the pixel values of the non-flat region of the provisional high-resolution image (Step S2703).

(3) Advantages

Accordingly, in the seventh embodiment, sharp enhancement of the resolution is achieved without emphasizing noise in the flat region.

Eighth Embodiment

Figure 28:
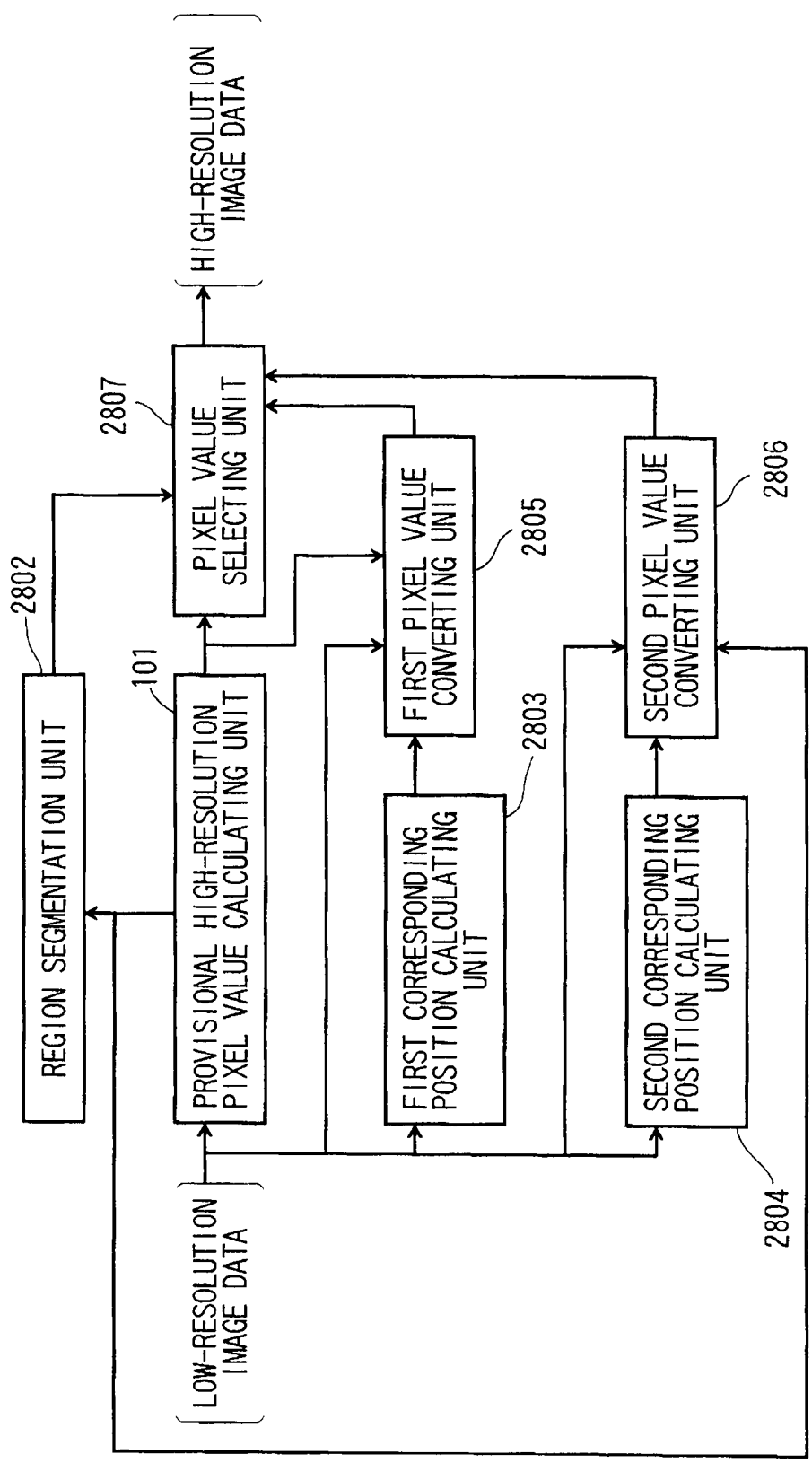
FIG. 28 is a block diagram of the image processing apparatus according to an eighth embodiment.
Figure 29:
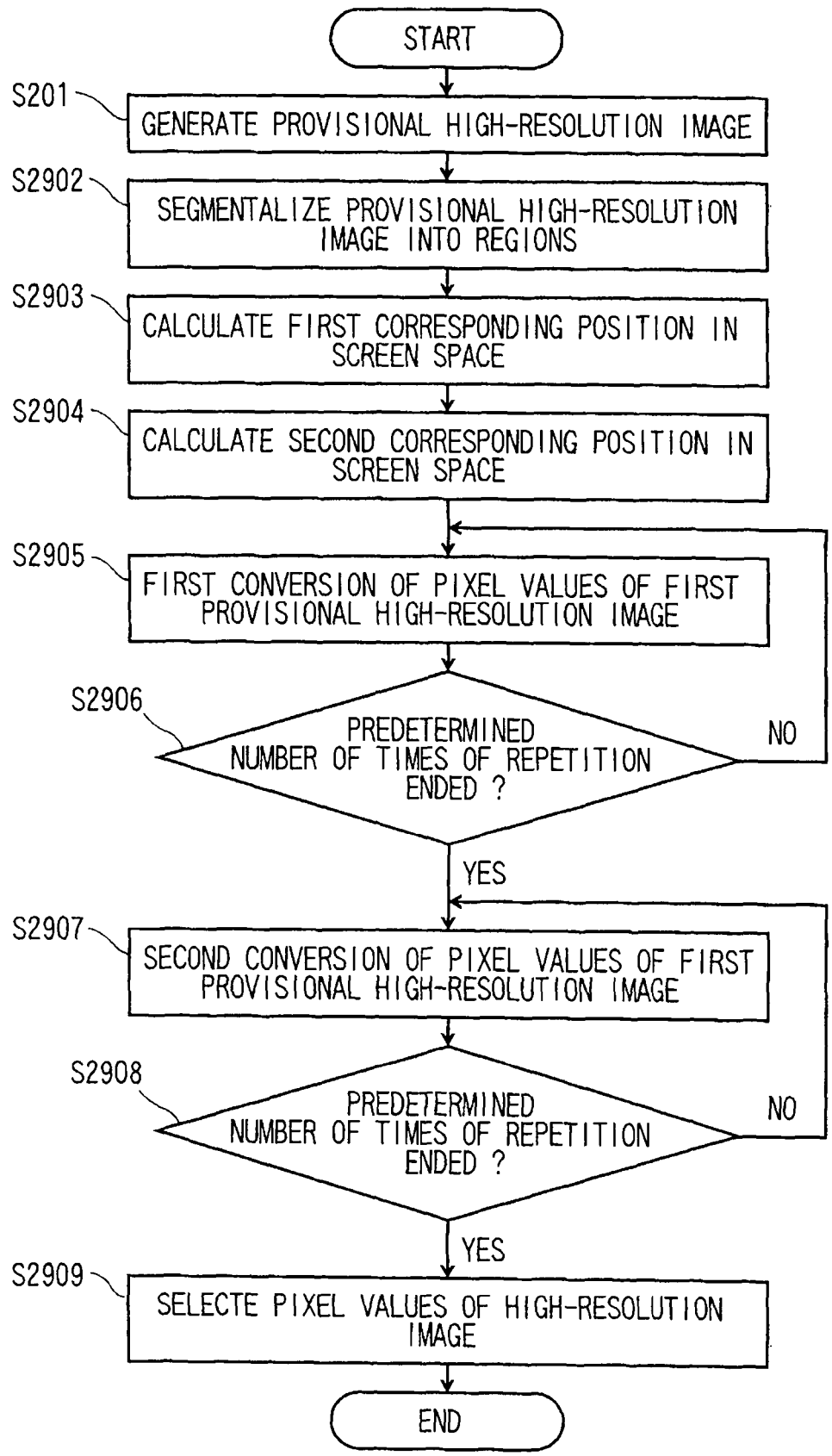
FIG. 29 is a flowchart showing an example of operation of the image processing apparatus according to the eighth embodiment.

Referring now to FIG. 28 and FIG. 29, the image processing apparatus according to an eighth embodiment of the invention will be described.

(1) Configuration

FIG. 28 is a block diagram of the image processing apparatus according to the eighth embodiment.

As shown in FIG. 28, the image processing apparatus according to the eighth embodiment includes the pixel value calculating unit 101, an region segmentation unit 2802, a first corresponding position calculating unit 2803, a second corresponding position calculating unit 2804, a first pixel value converting unit 2805, a second pixel value converting unit 2806 and a pixel value selecting unit 2807.

(1-1) Pixel Value Calculating Unit 101

The pixel value calculating unit 101 is operated in the same manner as described in conjunction with FIG. 1.

(1-2) Region Segmentation Unit 2802

The region segmentation unit 2802 receives a supply of a provisional high-resolution, segmentalizes the provisional high-resolution image into a first region to be enhanced in resolution on the basis of the corresponding positions in the reference frame, a second region to be enhanced in resolution on the basis of the corresponding positions between two or more frames included in the low-resolution image data and a third region to be enhanced in resolution through interpolation, and outputs area information.

(1-3) First Corresponding Position Calculating Unit 2803

The first corresponding position calculating unit 2803 sets a plurality of pixels in the reference frame including a still image composed of one frame one by one as a target pixel in sequence and calculates at least one or more corresponding positions of the target pixels in the reference frame in decimal accuracy.

(1-4) Second Corresponding Position Calculating Unit 2804

The second corresponding position calculating unit 2804 sets a plurality of pixels in at least two or more frames included in low-resolution image data one by one as a target pixel in sequence and calculates at least one or more corresponding positions of the target pixels in the reference frame in decimal accuracy.

(1-5) First Pixel Value Converting Unit 2805

The first pixel value converting unit 2805 applies addition and subtraction to the provisional high-resolution pixel values to make error between the pixel values of the target pixels and the estimated pixel values generated using the provisional high-resolution pixel values and the corresponding positions calculated by the first corresponding position calculating unit smaller.

(1-6) Second Pixel Value Converting Unit 2806

The second pixel value converting unit 2806 applies addition and subtraction to the provisional high-resolution pixel values to make error between the pixel values of the target pixels and the estimated pixel values generated using the provisional high-resolution pixel values and the corresponding positions calculated by the second corresponding position calculating unit smaller.

(1-7) Pixel Value Selecting Unit 2807

The pixel value selecting unit 2807 selects the pixel values of the provisional high-resolution image converted by the first pixel value converting unit 2805 in the first region, selects the pixel values of the provisional high-resolution image converted by the second pixel value converting unit 2806 in the second region, and selects the pixel values of the provisional high-resolution image in the third region.

(2) Operation

FIG. 29 is a flowchart for explaining operation of the image processing apparatus in FIG. 28.

The first step S201 is the same process as described in conjunction with FIG. 2.

Subsequently, the region segmentation unit 2802 receives a supply of a provisional high-resolution image, segmentalizes the provisional high-resolution image into a first region to be enhanced in resolution on the basis of the corresponding positions in the reference frame, a second region to be enhanced in resolution on the basis of the corresponding positions between two or more frames included in the low-resolution image data and a third region to be enhanced in resolution through interpolation, and outputs area information. (Step S2902)

The first corresponding position calculating unit 2803 sets a plurality of pixels in the reference frame including a still image composed of one frame one by one as a target pixel in sequence and calculates at least one or more corresponding positions of the target pixels in the reference frame in decimal accuracy (Step S2903).

Subsequently, the second corresponding position calculating unit 2804 sets a plurality of pixels in at least two or more frames included in low-resolution image data one by one as a target pixel in sequence and calculates at least one or more corresponding positions of the target pixels in the reference frame in decimal accuracy (Step S2904).

Subsequently, the first pixel value converting unit 2805 applies addition and subtraction to the provisional high-resolution pixel values to make error between the pixel values of the target pixels and the estimated pixel values generated using the provisional high-resolution pixel values and the corresponding positions calculated by the first corresponding position calculating unit smaller (Step S2905), and applies addition and subtraction to all the first corresponding positions successively. This process is further repeated by a predetermined number of times (Step S2906).

Subsequently, the second pixel value converting unit 2806 applies addition and subtraction to the provisional high-resolution pixel values to make the error between the pixel values of the target pixels and the estimated pixel values generated using the provisional high-resolution pixel values and the corresponding positions calculated by the second corresponding position calculating unit smaller (Step S2907), and applies addition and subtraction to all the second corresponding positions successively. This process is further repeated by a predetermined number of times (Step S2908).

Subsequently, the pixel value selecting unit 2807 selects the pixel values of the provisional high-resolution image converted by the first pixel value converting unit 2805 in the first region, selects the pixel values of the provisional high-resolution image converted by the second pixel value converting unit 2806 in the second region, and selects the pixel values of the provisional high-resolution image in the third region, so that the high-resolution image data is outputted (Step S2909).

(3) Advantages

Accordingly, a sharper high-resolution image may be generated by the high-resolution image according to the in-frame deterioration inverse conversion method, the high-resolution image according to the multi-frame deterioration inverse conversion method and the high-resolution image by the interpolation are combined on the pixel-to-pixel basis. In the eighth embodiment, the pixel values are selected by segmenting the provisional high-resolution image into regions. However, it is also possible to select the pixel values by segmenting the reference frame into regions.

Advantages of Embodiments

In the image processing apparatus according to the embodiments, since the pixel values are converted by segmenting the low-resolution image data into regions on the basis of the change of the pixel values and selecting the corresponding positions according to the region division information, the pixel value conversion with the sample values for which wrong corresponding positions are detected is eliminated, and emphasis of noise components in the flat region is avoided.

Especially when the processing is performed in the frame, the resolution is enhanced using self congruity in the frame of the shooting object. Therefore, it is not necessary to store a plurality of the low-resolution image data in the memory, so that the enhancement of the resolution is achieved with a small amount of memory in addition to the enhancement of image quality by the region segmentation.

In addition, a sharper high-resolution image may be generated by combining the in-frame deterioration inverse conversion method and the multi-frame deterioration inverse conversion method on the pixel-to-pixel basis by the region segmentation.

Modification

The invention is not limited to the above-described embodiment as is, and components may be modified without departing the scope of the invention in the stage of implementation.

In addition, various modes of the invention may be employed by combining the plurality of components disclosed in the above-described embodiments as needed. For example, some of components may be eliminated from all the components disclosed in the embodiments. Alternatively, the components in the different embodiments may be combined.

What is claimed is:

1. An image processing apparatus including a processor coupled to a memory, comprising:
    a pixel value calculating unit configured to calculate estimated pixel values of respective pixels of a provisional image composed of "m" pixels by interpolation based on pixel values of respective pixels in a reference frame having "n" pixels (m>n);
    a segmentation unit configured to segment an interior of the reference frame into (1) an edge region and a texture region, into (2) the edge region and a flat region, into (3) the texture region and the flat region, or into (4) the edge region, the texture region, and the flat region depending on the pixel values of respective pixels in the reference frame;
    a position calculating unit configured to set the respective pixels in the reference frame as target pixels one by one in sequence and to calculate corresponding positions on the provisional image, of the respective target pixels, in decimal accuracy, which is finer than pixel intervals, based on information on the segmented edge region, texture region, or flat region including the target pixels;
    a converting unit configured to modify the respective estimated pixel values so that a finite difference from the pixel values of the target pixels to the provisionally estimated pixel values of the target pixels, which are obtained from the estimated pixel values of the provisional image for pixels around the corresponding positions of the target pixels, becomes smaller, and to obtain modified pixel values; and
    an output unit configured to output an image composed of "m" pixels having the modified pixel values.

2. The apparatus according to claim 1, wherein the position calculating unit is configured to calculate the corresponding position using pixel values of pixels of a plurality of frames before and after the reference frame in time sequence, in addition to the pixel values of the respective pixels in the reference frame, when the segmented regions in which the target pixels are included is the edge region.

3. The apparatus according to claim 1, wherein the position calculating unit is configured to calculate the corresponding positions only from the pixel values of the respective pixels in the reference frame, when the segmented region in which the target pixels are included is the edge region.

4. The apparatus according to claim 1, wherein the position calculating unit is configured to calculate the corresponding positions only from the pixel values of the respective pixels in the reference frame, when the segmented region in which the target pixels are included is the texture region.

5. The apparatus according to claim 1, wherein the respective estimated pixel values are determined as the modified pixel values when the segmented region in which the target pixels are included is the flat region.

6. The apparatus according to claim 1, wherein the position calculating unit is configured to calculate the corresponding positions utilizing self congruity in the reference frame.

7. An image processing method, comprising:
    calculating estimated pixel values of respective pixels of a provisional image composed of m pixels by interpolation based on pixel values of the respective pixels in a reference frame having n pixels (m>n);
    segmenting an interior of the reference frame into (1) an edge region and a texture region, into (2) the edge region and a flat region, into (3) the texture region and the flat region, or into (4) the edge region, the texture region, and the flat region depending on the pixel values of the respective pixels in the reference frame;
    setting the respective pixels in the reference frame as target pixels one by one in sequence and calculating corresponding positions on the provisional image corresponding to the respective target pixels, in decimal accuracy, which is finer than pixel intervals, based on information on the segmented edge region, texture region, or flat region including the target pixels;
    modifying the respective estimated pixel values so that a finite difference between the provisionally estimated pixel values of the target pixels obtained from the estimated pixel values of the provisional image for pixels around the corresponding positions of the target pixels and the pixel values of the target pixels becomes smaller, and obtaining modified pixel values; and
    outputting an image composed of m pixels having the modified pixel values.

8. A non-transitory computer readable storage medium on which a program for image processing is stored, the program including instructions which, when executed by a processor, cause the processor to execute a method comprising:
    calculating estimated pixel values of respective pixels of a provisional image composed of m pixels by interpolation based on the pixel values of the respective pixels in a reference frame having n pixels (m>n);
    segmenting an interior of the reference frame into (1) an edge region and a texture region, into (2) the edge region and a flat region, into (3) the texture region and the flat region, or into (4) the edge region, the texture region, and the flat region depending on the pixel values of the respective pixels in the reference frame;
    setting the respective pixels in the reference frame as target pixels one by one in sequence and calculating corresponding positions on the provisional image corresponding to the respective target pixels, in decimal accuracy, which is finer than pixel intervals, based on information on the segmented edge region, texture region, or flat region including the target pixels;
    modifying the respective estimated pixel values so that a finite difference between the provisionally estimated pixel values of the target pixels obtained from the estimated pixel values of the provisional image for pixels around the corresponding positions of the target pixels and the pixel values of the target pixels becomes smaller, and obtaining modified pixel values; and
    outputting an image composed of m pixels having the modified pixel values.

* * * * *